United States Patent
Ihara et al.

(10) Patent No.: US 11,383,984 B2
(45) Date of Patent: Jul. 12, 2022

(54) NANOCARBON SEPARATION DEVICE, NANOCARBON SEPARATION METHOD, AND NANOCARBON RECOVERY METHOD

(71) Applicant: NEC CORPORATION, Tokyo (JP)

(72) Inventors: Kazuki Ihara, Tokyo (JP); Mayumi Kosaka, Tokyo (JP); Ryota Yuge, Tokyo (JP); Hideaki Numata, Tokyo (JP); Fumiyuki Nihey, Tokyo (JP)

(73) Assignee: NEC CORPORATION, Tokyo (JP)

( * ) Notice: Subject to any disclaimer, the term of this patent is extended or adjusted under 35 U.S.C. 154(b) by 283 days.

(21) Appl. No.: 16/754,597

(22) PCT Filed: Oct. 10, 2017

(86) PCT No.: PCT/JP2017/036718
§ 371 (c)(1),
(2) Date: Apr. 8, 2020

(87) PCT Pub. No.: WO2019/073531
PCT Pub. Date: Apr. 18, 2019

(65) Prior Publication Data
US 2020/0283296 A1  Sep. 10, 2020

(51) Int. Cl.
*C01B 32/172* (2017.01)
*B01D 47/00* (2006.01)

(52) U.S. Cl.
CPC .......... *C01B 32/172* (2017.08); *B01D 47/00* (2013.01); *C01B 2202/02* (2013.01)

(58) Field of Classification Search
CPC ... C01B 32/172; C01B 2202/02; C01B 32/15; B01D 47/00; B01D 57/02
See application file for complete search history.

(56) References Cited

U.S. PATENT DOCUMENTS

| 7,867,468 B1* | 1/2011 | Haddon | ................. B82Y 40/00 |
| | | | 977/720 |
| 2011/0308968 A1* | 12/2011 | Howard | ................... C25B 1/00 |
| | | | 205/768 |

FOREIGN PATENT DOCUMENTS

| JP | 2008-55375 A | 3/2008 |
| JP | 2012-36041 A | 2/2012 |
| JP | 5541283 B2 | 7/2014 |
| JP | 5717233 B2 | 5/2015 |
| JP | 2017-1919 A | 1/2017 |
| WO | 2008/143281 A1 | 11/2008 |
| WO | 2010/150808 A1 | 12/2010 |

OTHER PUBLICATIONS

International Search Report for PCT/JP2017/036718 dated Nov. 28, 2017 [PCT/ISA/210].

* cited by examiner

*Primary Examiner* — Daniel C. McCracken
(74) *Attorney, Agent, or Firm* — Sughrue Mion, PLLC

(57) ABSTRACT

A nanocarbon separation device includes a separation tank which is configured to accommodate a dispersion liquid including a nanocarbon, a first electrode that is provided at an upper part in the separation tank, a second electrode that is provided at a lower part in the separation tank, and a partition member that is provided between the first electrode and the second electrode in the separation tank, and the partition member partitions the separation tank into a plurality of regions.

10 Claims, 9 Drawing Sheets

NANOCARBON SEPARATION DEVICE, NANOCARBON SEPARATION METHOD, AND NANOCARBON RECOVERY METHOD

CROSS REFERENCE TO RELATED APPLICATIONS

This application is a National Stage of International Application No. PCT/JP2017/036718, filed on Oct. 10, 2017.

TECHNICAL FIELD

The present invention relates to a nanocarbon separation device, a nanocarbon separation method, and a nanocarbon recovery method.

BACKGROUND ART

Single-walled carbon nanotubes have high electron mobility and are expected to be applied to various fields due to their mechanical properties, electrical properties, chemical properties, and the like. Since single-walled carbon nanotubes are synthesized as a mixture of materials having different properties, including semiconducting and metallic properties, at a ratio of 2:1, it is necessary to perform separation for each property with high purity and rapidly for industrial applications.

As a method of separating a mixture of single-walled carbon nanotubes, for example, a nanocarbon material separation method including a step of introducing a dispersion liquid including nanocarbon materials dispersed in nanocarbon micelle groups having a plurality of different charges and a holding solution having a specific gravity different from that of the nanocarbon materials into an electrophoresis tank by laminating the solutions and arranging them in a predetermined direction, and a step of separating the nanocarbon micelle groups into two or more nanocarbon micelle groups by applying a direct current voltage in a serial direction to the introduced, arranged and laminated dispersion liquid and holding solution is known (for example, refer to Patent Document 1). In addition, a single-walled carbon nanotube separation method including a step in which a direct current voltage is applied to a single-walled carbon nanotube-containing micelle dispersion liquid in which single-walled carbon nanotubes are dispersed in a non-ionic surfactant solution in a vertically installed separation tank, and the mixture is separated into at least two layers including a single-walled carbon nanotube-containing micelle dispersion liquid layer in which metallic single-walled carbon nanotubes in which micelles have a positive charge as a whole are concentrated and a semiconducting single-walled carbon nanotube-containing micelle dispersion liquid layer in which micelles have a very weak charge as a whole, and in which a direct current voltage is applied to a negative electrode installed at an upper part and a positive electrode installed at a lower part in the separation tank, the direction of an electric field is upward and parallel to the direction of gravity is known (for example, refer to Patent Document 2).

PRIOR ART DOCUMENTS

Patent Documents

[Patent Document 1] Japanese Patent No. 5541283
[Patent Document 2] Japanese Patent No. 5717233

SUMMARY OF THE INVENTION

Problem to be Solved by the Invention

However, the separation methods described in Patent Documents 1 and 2 have problems that, when the diameter of the separation tank is increased in order to separate a large amount of a mixture of single-walled carbon nanotubes at a time, disturbance occurs due to convection of the dispersion liquid including the single-walled carbon nanotube and the like in the separation tank according to the increase in the diameter, and the separation takes time.

An object of the present invention is to provide a nanocarbon separation device, a nanocarbon separation method, and a nanocarbon recovery method through which, in separation of a mixture of nanocarbons, it is possible to improve the separation efficiency or shorten a time required for the separation.

Means for Solving the Problem

A nanocarbon separation device of the present invention includes a separation tank which is configured to accommodate a dispersion liquid including a nanocarbon; a first electrode that is provided at an upper part in the separation tank; a second electrode that is provided at a lower part in the separation tank; and a partition member that is provided between the first electrode and the second electrode in the separation tank, wherein the partition member partitions the separation tank into a plurality of regions.

A nanocarbon separation method of the present invention is a nanocarbon separation method using the nanocarbon separation device of the present invention, which includes a step of injecting a dispersion liquid including a nanocarbon into the separation tank and a step of separating metallic nanocarbons and semiconducting nanocarbons included in the dispersion liquid by applying a direct current voltage to the first electrode and the second electrode.

A nanocarbon recovery method of the present invention is a nanocarbon recovery method using the nanocarbon separation device of the present invention, which includes recovering metallic single-walled carbon nanotubes and semiconducting nanocarbons included in the dispersion liquid from the separation tank after a separation operation by the nanocarbon separation device is completed.

Effect of the Invention

According to the present invention, in separation of a mixture of nanocarbons, it is possible to improve the separation efficiency. In addition, according to the present invention, in separation of nanocarbons having different properties, it is possible to shorten a time required for the separation.

EMBODIMENTS FOR CARRYING OUT THE INVENTION

A nanocarbon separation device, a nanocarbon separation method, and a nanocarbon recovery method according to example embodiments of the present invention will be described.

Here, the present example embodiment is described in detail in order for better understanding of the spirit of the present invention, and does not limit the present invention unless otherwise specified.

First Example Embodiment (Nanocarbon Separation Device)

Figure 1:
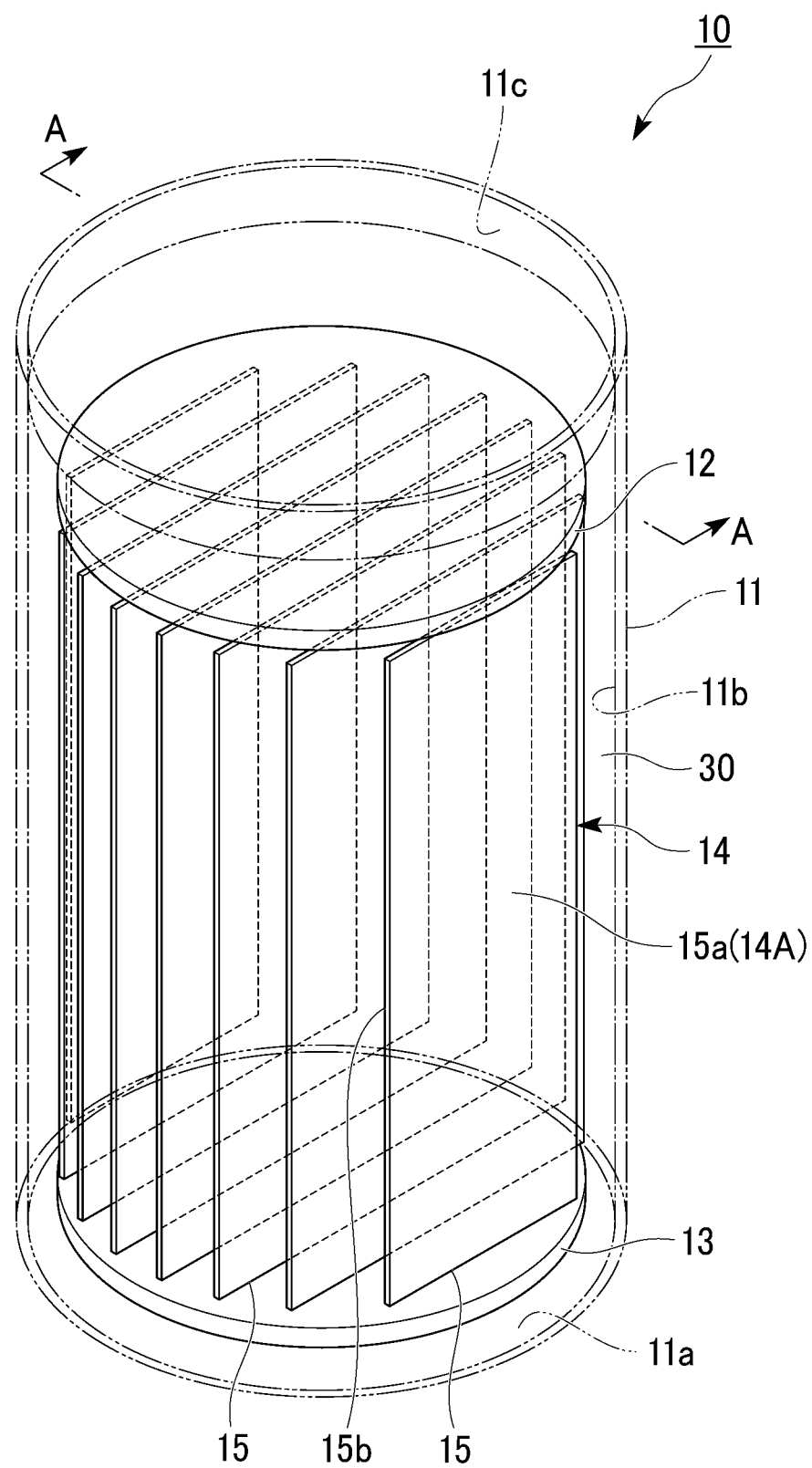
FIG. 1 is a perspective view showing a nanocarbon separation device of a first example embodiment.

FIG. 1 is a perspective view showing a nanocarbon separation device of the present example embodiment.

A nanocarbon separation device 10 of the present example embodiment includes a separation tank (electrophoresis tank) 11, a first electrode 12 provided at an upper part in the separation tank 11, a second electrode 13 provided at a lower part in the separation tank 11, and a partition member 14 that is provided between the first electrode 12 and the second electrode 13 in the separation tank 11 and extends in the height direction of the separation tank 11.

The partition member 14 partitions the separation tank 11 into a plurality of regions. The partition member 14 has a wall 14A. The wall 14A extends in a vertical direction of the separation tank 11. The partition member 14 may have a plurality of walls 14A.

The first electrode 12 is disposed at an upper part in the height direction (in the separation tank 11, in a region higher than half of the height, which is a region opposite to an inner bottom surface 11a of the separation tank 11) in the separation tank 11.

The second electrode 13 is disposed at a lower part in the height direction (in the separation tank 11, a region lower than half of the height, which is a region on the side of the inner bottom surface 11a of the separation tank 11) in the separation tank 11.

In the nanocarbon separation device 10 of the present example embodiment, for example, the first electrode 12 is a negative electrode, and the second electrode 13 is a positive electrode. In this case, when a direct current (DC) voltage is applied to the first electrode 12 and the second electrode 13, the direction of the electric field is directed from a bottom of the separation tank 11 upward.

The separation tank 11 has a space in which a dispersion liquid including a nanocarbon (hereinafter referred to as a "nanocarbon dispersion liquid") 30 can be accommodated. In the separation tank 11, nanocarbons dispersed in the accommodated nanocarbon dispersion liquid 30 can be separated through carrier-free electrophoresis. The shape and size of the separation tank 11 are not particularly limited as long as the separation tank 11 can accommodate the nanocarbon dispersion liquid 30.

The separation tank 11 is a container having a hollow tube shape. The separation tank 11 has an opening at the upper end. The lower end of the separation tank 11 is closed and forms the bottom of the container.

The material of the separation tank 11 is not particularly limited as long as it is stable with respect to the nanocarbon dispersion liquid 30 and is an insulating material. Examples of materials of the separation tank 11 include glass, quartz, and acrylic resin.

The first electrode 12 and the second electrode 13 are not particularly limited as long as they can be used for carrier-free electrophoresis and are stable with respect to the nanocarbon dispersion liquid 30. Examples of the first electrode 12 and the second electrode 13 include a platinum electrode.

The structures of the first electrode 12 and the second electrode 13 are not particularly limited, and in the separation tank 11, are appropriately selected according to the shape and size of regions partitioned by the partition member 14. The structure of the first electrode 12 is not particularly limited as long as it is disposed at an upper part of the partition member 14 and is disposed to extend over the entire upper end of the partition member 14 in the separation tank 20. The structure of the second electrode 13 is not particularly limited as long as it is disposed at a lower part of the partition member 14 and is disposed to extend over the entire lower end of the partition member 14 in the separation tank 20. Examples of structures of the first electrode 12 and the second electrode 13 include an annular shape, a disk shape, and a rod shape in a plan view of the separation tank 11. In addition, examples of the structures of the first electrode 12 and the second electrode 13 include a porous plate shape in which a plurality of fine pores are uniformly provided. FIG. 1 shows the first electrode 12 and the second electrode 13 which have a disk shape.

The partition member 14 is composed of a plate member 15 that extends in the vertical direction of the separation tank 11, and a plurality of plate members 15 are provided in the separation tank 11. In addition, as shown in FIG. 1, the plurality of plate members 15 are arranged in the horizontal direction of the separation tank 11. Thereby, the interior of the separation tank 11 is partitioned into a plurality of regions by the partition member 14. The plate member 15 has one main surface 15a.

The plate member 15 preferably extends in a region between the first electrode 12 and the second electrode 13 in the separation tank 11 over substantially the entire region in the height direction.

The size (the area of the one main surface 15a) of the plate member 15 is not particularly limited, and when the plate member 15 is disposed in the separation tank 11, one side surface 15b of the plate member 15 and a side surface opposite to the one side surface 15b are preferably disposed near an inner surface 11b of the separation tank 11.

The thickness of the plate member 15 is not particularly limited, and is appropriately adjusted according to the size of the separation tank 11, the number of plate members 15 disposed in the separation tank 11, and the like.

The interval between the plate members 15 in the horizontal direction of the separation tank 11 is not particularly limited, and is appropriately set according to the amount (volume) of the nanocarbon dispersion liquid 30 accommodated in the separation tank 11. In addition, the number of plate members 15 is not particularly limited, and is appropriately set according to the amount (volume) of the nanocarbon dispersion liquid 30 accommodated in the separation tank 11.

The material of the plate member 15 is not particularly limited as long as it is stable with respect to the nanocarbon dispersion liquid 30 and is an insulating material. Examples of materials of the plate member 15 include glass, quartz, and acrylic resin.

The nanocarbon separation device 10 of the present example embodiment may include an injection port (not shown) through which the nanocarbon dispersion liquid 30 is injected into the separation tank 11. The injection port may be provided at an upper part in the height direction (in the separation tank 11, in a region higher than half of the height, which is a region opposite to the inner bottom surface 11a of the separation tank 11) in the separation tank 11. When the upper end of the separation tank 11 is an opening 11c, the opening 11c may be an injection port through which the nanocarbon dispersion liquid 30 is injected into the separation tank 11. In addition, when the nanocarbon dispersion liquid 30 is sucked from the upper part of the separation tank 11 and the nanocarbon dispersion liquid 30 is recovered, the opening 11c at the upper end of the separation tank 11 may also serve as a recovery port for recovering the nanocarbon dispersion liquid 30 from the separation tank 11.

Figure 2:
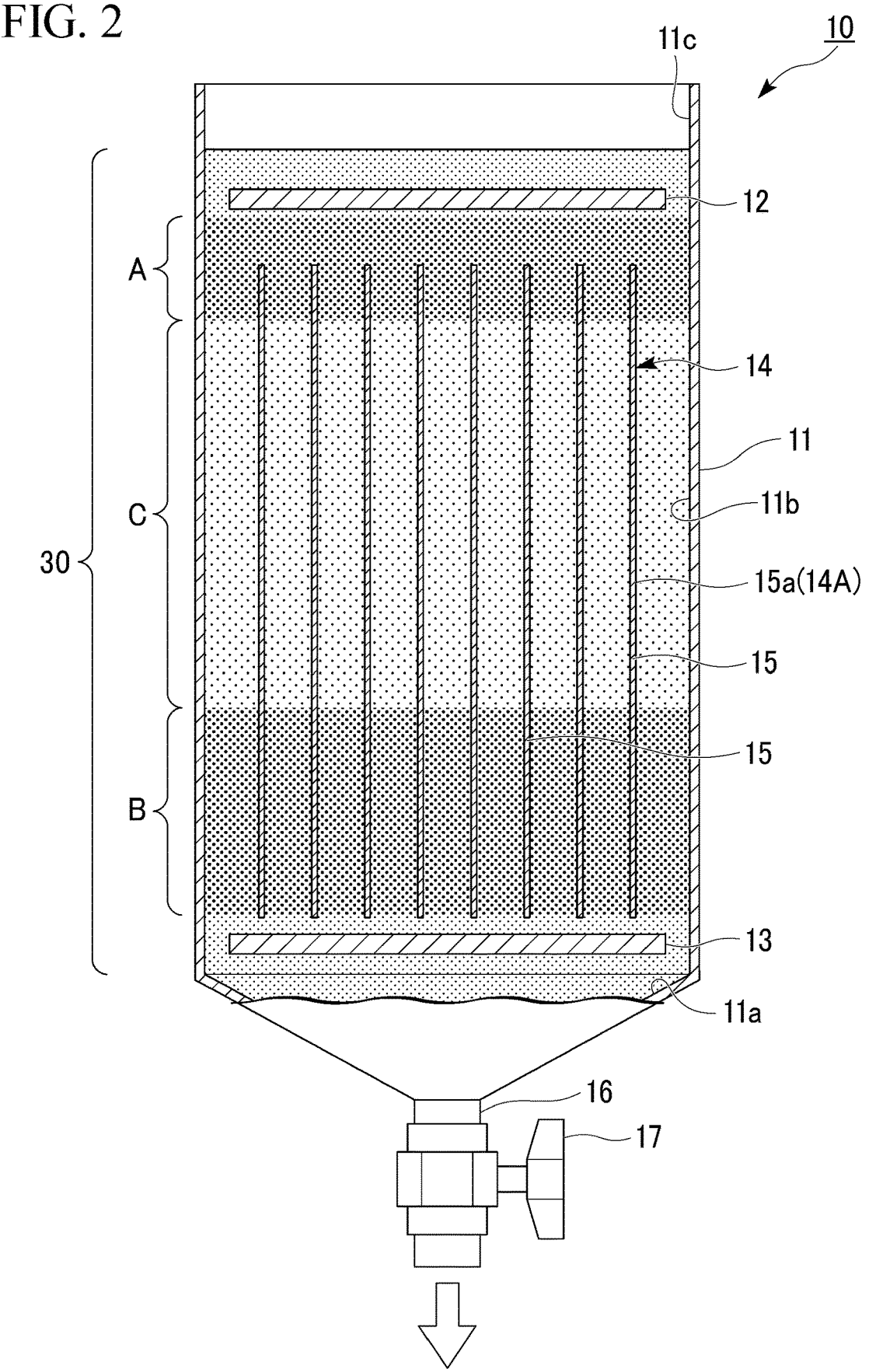
FIG. 2 is an example of a cross-sectional view taken along the line A-A in FIG. 1.

In addition, as shown in FIG. 2, the nanocarbon separation device 10 may include an injection/recovery port 16 that communicates with the inner bottom surface 11a of the separation tank 11 at the lower end of the separation tank 11. The injection/recovery port 16 is used for injecting the nanocarbon dispersion liquid 30 into the separation tank 11 and recovering the nanocarbon dispersion liquid 30 from the separation tank 11. In addition, the injection/recovery port 16 may have a closed structure such as a rotary cock 17 having a ground glass joint.

A part of the separation tank 11 that forms the inner bottom surface 11a and communicates with the injection/recovery port 16 has a tapered shape whose width (diameter) gradually decreases toward the injection/recovery port 16. Since the inner bottom surface 11a of the separation tank 11 has a tapered shape, the nanocarbon dispersion liquid 30 in the separation tank 11 can be recovered smoothly.

When the nanocarbon dispersion liquid 30 is gently injected and recovered using, for example, a peristaltic pump through the injection/recovery port 16 at the bottom of the separation tank 11, there is no need to move the injection/recovery port according to change in the liquid level during injection/recovery, and the injection/recovery operation can be performed without disturbing the liquid phase interface inside the separation tank 11. In addition, when the capacity of the separation tank 11 is increased, there is no need to prepare a long injection/recovery nozzle, which is very reasonable.

Figure 3:
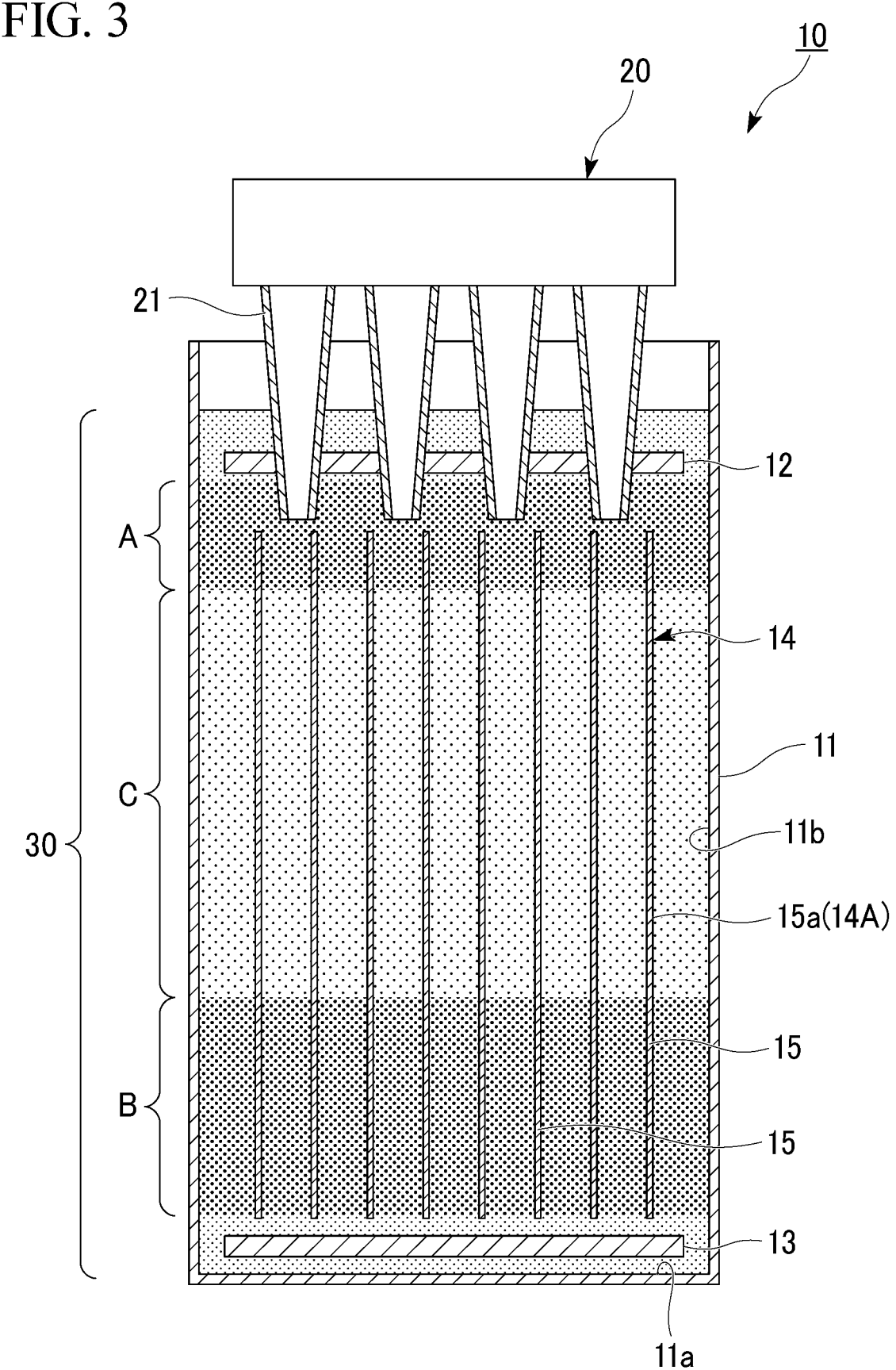
FIG. 3 is another example of a cross-sectional view taken along the line A-A in FIG. 1.

In addition, as shown in FIG. 3, the nanocarbon separation device 10 may include the suction device 20 through which the nanocarbon dispersion liquid 30 is sucked from the upper part of the separation tank 11 and the nanocarbon dispersion liquid 30 is recovered separately from the separation tank 11. The suction device 20 includes a suction tube 21 composed of a microsyringe or the like in order to suck the nanocarbon dispersion liquid 30 from the separation tank 11. The suction tube 21 extends from the main body of the suction device 20 to an arbitrary position in the separation tank 11.

In addition, in a nanocarbon separation method using the nanocarbon separation device 10 to be described below, when a temperature gradient occurs in the separation tank 11, a convection phenomenon of the nanocarbon dispersion liquid 30 may occur in the separation tank 11. As a result, it is not possible to stably separate metallic nanocarbons and semiconducting nanocarbons contained in the nanocarbon dispersion liquid 30. Here, the nanocarbon separation device 10 preferably includes a temperature adjusting unit for keeping the temperature of the nanocarbon dispersion liquid 30 in the separation tank 11 constant. The temperature adjusting unit is not particularly limited as long as it can keep the temperature of a liquid accommodated in a container constant, and, for example, any unit such as mounting a water cooling jacket can be used.

While a case in which the first electrode 12 is a negative electrode and the second electrode 13 is a positive electrode has been provided as an exemplary example of the nanocarbon separation device 10 of the present example embodiment, the nanocarbon separation device 10 of the present example embodiment is not limited thereto. In the nanocarbon separation device 10 of the present example embodiment, the first electrode 12 may be a positive electrode and the second electrode 13 may be a negative electrode.

According to the nanocarbon separation device 10 of the present example embodiment, when the partition member 14 composed of the plurality of plate members 15 that are arranged in the horizontal direction of the separation tank 11 is provided between the first electrode 12 and the second electrode 13, for example, in a step of separating metallic nanocarbons and semiconducting nanocarbons contained in the nanocarbon dispersion liquid 30 which is performed in a nanocarbon separation method to be described below, it is possible to inhibit the occurrence of a horizontal flow in the nanocarbon dispersion liquid 30 in the separation tank 11 and the occurrence of disturbance due to convection of the nanocarbon dispersion liquid 30 and the like. Therefore, it is possible to separate metallic nanocarbons and semiconducting nanocarbons quickly and efficiently. Accordingly, it is possible to obtain highly pure metallic nanocarbons and semiconducting nanocarbons.

(Nanocarbon Separation Method)

A nanocarbon separation method using the nanocarbon separation device 10 will be described and also operations of the nanocarbon separation device 10 will be described with reference to FIG. 1 to FIG. 4.

Figure 4:
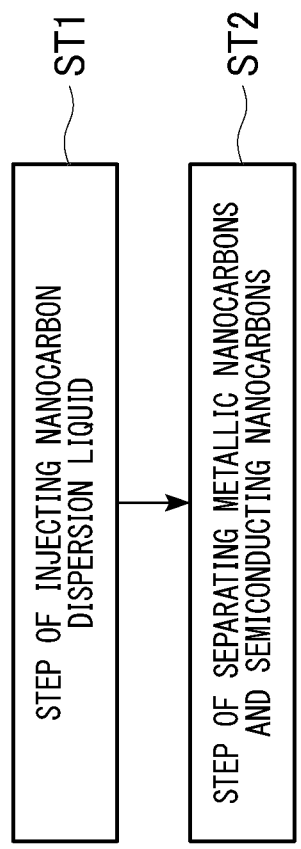
FIG. 4 is a flowchart showing a nanocarbon separation method of the present invention.

FIG. 4 is a flowchart showing a nanocarbon separation method of the present example embodiment.

The nanocarbon separation method of the present example embodiment includes a step of injecting the nanocarbon dispersion liquid 30 into the separation tank 11 (hereinafter referred to as an "injection step") and a step of separating metallic nanocarbons and semiconducting nanocarbons contained in the nanocarbon dispersion liquid 30 by applying a direct current voltage to the first electrode 12 and the second electrode 13 (hereinafter referred to as a "separation step").

In the nanocarbon separation method of the present example embodiment, the nanocarbon refers to a carbon material mainly composed of carbon such as single-walled carbon nanotubes, double-walled carbon nanotubes, multi-walled carbon nanotubes, carbon nanohorns, carbon nanotwists, graphene, fullerene, and the like. In the nanocarbon separation method of the present example embodiment, a case in which semiconducting single-walled carbon nanotubes and metallic single-walled carbon nanotubes are separated from a dispersion liquid in which single-walled carbon nanotubes as nanocarbons are dispersed will be described in detail.

It is known that single-walled carbon nanotubes are divided into a metallic type and a semiconducting type with two different properties according to the diameter of the tube and a winding configuration. When single-walled carbon nanotubes are synthesized using a conventional production method, a mixture of single-walled carbon nanotubes including metallic single-walled carbon nanotubes having metallic properties and semiconducting single-walled carbon nanotubes having semiconducting properties at a statistical ratio of 1:2 is obtained.

The mixture of single-walled carbon nanotubes is not particularly limited as long as it contains metallic single-walled carbon nanotubes and semiconducting single-walled carbon nanotubes. In addition, the single-walled carbon nanotubes in the present example embodiment may be single-walled carbon nanotubes alone or single-walled carbon nanotubes in which some of carbon atoms are substituted with an arbitrary functional group or single-walled carbon nanotubes that are modified with an arbitrary functional group.

First, a single-walled carbon nanotube dispersion liquid in which a mixture of single-walled carbon nanotubes is dispersed in a dispersion medium together with a surfactant is prepared.

The dispersion medium is not particularly limited as long as it allows the mixture of single-walled carbon nanotubes to be dispersed. Examples of dispersion mediums include water, heavy water, an organic solvent, and an ionic liquid. Among these dispersion mediums, water or heavy water is suitably used because single-walled carbon nanotubes do not deteriorate.

Regarding the surfactant, a non-ionic surfactant, a cationic surfactant, an anionic surfactant and the like are used. A non-ionic surfactant is preferably used in order to prevent ionic impurities such as sodium ions from being mixed into single-walled carbon nanotubes.

Regarding the non-ionic surfactant, a non-ionic surfactant having a non-ionizable hydrophilic moiety and a hydrophobic moiety such as an alkyl chain is used. Examples of such a non-ionic surfactant include a non-ionic surfactant having a polyethylene glycol structure represented by a polyoxyethylene alkyl ether type.

Regarding such a non-ionic surfactant, a polyoxyethylene alkyl ether represented by the following Formula (1) is suitably used.

$$C_nH_{2n}(OCH_2CH_2)_mOH \tag{1}$$

(here, n=12 to 18, m=20 to 100.)

Examples of a polyoxyethylene alkyl ether represented by Formula (1) include polyoxyethylene (23) lauryl ether (product name: Brij L23, commercially available from Sigma-Aldrich), polyoxyethylene (20) cetyl ether (product name: Brij C20, commercially available from Sigma-Aldrich), polyoxyethylene (20) stearyl ether (product name: Brij S20, commercially available from Sigma-Aldrich), polyoxyethylene (20) oleyl ether (product name: Brij O20, commercially available from Sigma-Aldrich), and polyoxyethylene (100) stearyl ether (product name: Brij S100, commercially available from Sigma-Aldrich).

Regarding the non-ionic surfactant, polyoxyethylene sorbitan monostearate (molecular formula: $C_{64}H_{126}O_{26}$, product name: Tween 60, commercially available from Sigma-Aldrich), polyoxyethylene sorbitan trioleate (molecular formula: $C_{24}H_{44}O_6$, product name: Tween 85, commercially available from Sigma-Aldrich), octylphenol ethoxylate (molecular formula: $C_{14}H_{22}O(C_2H_4O)_n$, n=1 to 10, product name: Triton X-100, commercially available from Sigma-Aldrich), polyoxyethylene (40) isooctyl phenyl ether (molecular formula: $C_8H_{17}C_6H_{40}(CH_2CH_{20})_{40}H$, product name: Triton X-405, commercially available from Sigma-Aldrich), poloxamer (molecular formula: $C_5H_{10}O_2$, product name: Pluronic, commercially available from Sigma-Aldrich), and polyvinyl pyrrolidone (molecular formula: $(C_6H_9NO)_n$, n=5 to 100, commercially available from Sigma-Aldrich) or the like can be used.

The amount of the non-ionic surfactant in the single-walled carbon nanotube dispersion liquid is preferably 0.1 wt % or more and 5 wt % or less and more preferably 0.5 wt % or more and 2 wt % or less.

When the amount of the non-ionic surfactant is 0.1 wt % or more, a pH gradient of the single-walled carbon nanotube dispersion liquid can be formed in the separation tank 11 through carrier-free electrophoresis. On the other hand, when the amount of the non-ionic surfactant is 5 wt % or less, the viscosity of the single-walled carbon nanotube dispersion liquid does not become too high, metallic single-walled carbon nanotubes and semiconducting single-walled carbon nanotubes contained in the single-walled carbon nanotube dispersion liquid can be easily separated through carrier-free electrophoresis.

The amount of single-walled carbon nanotubes in the single-walled carbon nanotube dispersion liquid is preferably 1 µg/mL or more and 100 µg/mL or less and more preferably 5 µg/mL or more and 40 µg/mL or less.

When the amount of single-walled carbon nanotubes is within the above range, metallic single-walled carbon nanotubes and semiconducting single-walled carbon nanotubes contained in the single-walled carbon nanotube dispersion liquid can be easily separated through carrier-free electrophoresis.

A method of preparing a single-walled carbon nanotube dispersion liquid is not particularly limited, and a known method is used. For example, a method in which a mixed solution of a dispersion medium containing a mixture of single-walled carbon nanotubes and a surfactant is subjected to an ultrasonic treatment and the mixture of single-walled carbon nanotubes is dispersed in the dispersion medium is an exemplary example. According to this ultrasonic treatment, the aggregated metallic single-walled carbon nanotubes and semiconducting single-walled carbon nanotubes are sufficiently separated, and in the single-walled carbon nanotube dispersion liquid, metallic single-walled carbon nanotubes and semiconducting single-walled carbon nanotubes are uniformly dispersed in the dispersion medium. Therefore, metallic single-walled carbon nanotubes and semiconducting single-walled carbon nanotubes are easily separated through carrier-free electrophoresis to be described below. Here, metallic single-walled carbon nanotubes and semiconducting single-walled carbon nanotubes that are not dispersed according to an ultrasonic treatment are preferably separated and removed through ultracentrifugation.

Next, in the injection step, the single-walled carbon nanotube dispersion liquid prepared as described above is injected into the separation tank 11 (ST1).

In addition, when the single-walled carbon nanotube dispersion liquid is injected into the separation tank 11, the first electrode 12 and the second electrode 13 are brought into contact with the single-walled carbon nanotube dispersion liquid. In the present example embodiment, the first electrode 12 and the second electrode 13 are immersed in the single-walled carbon nanotube dispersion liquid.

Next, in the separation step, metallic single-walled carbon nanotubes and semiconducting single-walled carbon nanotubes contained in the single-walled carbon nanotube dispersion liquid are separated through carrier-free electrophoresis (ST2).

When a direct current voltage is applied to the first electrode 12 and the second electrode 13 for a predetermined time (for example, 1 hour to 24 hours), an electric field is formed in the separation tank 11. Specifically, the electric field is formed so that the direction of the electric field is directed from a bottom of the separation tank 11 upward. Due to an electrophoretic force generated by the electric field and the charge of single-walled carbon nanotubes, a mixture of single-walled carbon nanotubes contained in the single-walled carbon nanotube dispersion liquid are separated into metallic single-walled carbon nanotubes and semiconducting single-walled carbon nanotubes.

In the single-walled carbon nanotube dispersion liquid containing a non-ionic surfactant, metallic single-walled carbon nanotubes have a positive charge, and semiconducting single-walled carbon nanotubes have a very weak negative charge.

Thus, when a direct current voltage is applied to the first electrode 12 and the second electrode 13, in the mixture of single-walled carbon nanotubes contained in the single-walled carbon nanotube dispersion liquid, metallic single-walled carbon nanotubes move toward the first electrode 12 (negative electrode), and semiconducting single-walled carbon nanotubes move toward the second electrode 13 (positive electrode). As a result, the phase of the single-walled carbon nanotube dispersion liquid is separated into three phases including a dispersion liquid phase having a relatively large amount of metallic single-walled carbon nanotubes (hereinafter referred to as a "dispersion liquid phase A"), a dispersion liquid phase having a relatively large amount of semiconducting single-walled carbon nanotubes (hereinafter referred to as a "dispersion liquid phase B"), and a dispersion liquid phase which is formed between the dispersion liquid phase A and the dispersion liquid phase B and has a relatively small amount of metallic single-walled carbon nanotubes and semiconducting single-walled carbon nanotubes (hereinafter referred to as a "dispersion liquid phase C").

In the present example embodiment, the dispersion liquid phase A is formed on the side of the first electrode 12, and the dispersion liquid phase B is formed on the side of the second electrode 13.

A direct current voltage applied to the first electrode 12 and the second electrode 13 is not particularly limited, and is appropriately adjusted according to a distance between the first electrode 12 and the second electrode 13, the amount of the mixture of single-walled carbon nanotubes in the single-walled carbon nanotube dispersion liquid, or the like.

When water or heavy water is used as the dispersion medium of the single-walled carbon nanotube dispersion liquid, a direct current voltage applied to the first electrode 12 and the second electrode 13 has any value that is larger than 0 V and equal to and less than 1,000 V.

For example, when a distance between the first electrode 12 and the second electrode 13 (inter-electrode distance) is 30 cm, a direct current voltage applied to the first electrode 12 and the second electrode 13 is preferably 15 V or more and 450 V or less and more preferably 30 V or more and 300 V or less.

When a direct current voltage applied to the first electrode 12 and the second electrode 13 is 15 V or more, a pH gradient of the single-walled carbon nanotube dispersion liquid is formed in the separation tank 11, and it is possible to separate metallic single-walled carbon nanotubes and semiconducting single-walled carbon nanotubes contained in the single-walled carbon nanotube dispersion liquid. On the other hand, when a direct current voltage applied to the first electrode 12 and the second electrode 13 is 450 V or less, the influence of electrolysis of water or heavy water is reduced.

In addition, when a direct current voltage is applied to the first electrode 12 and the second electrode 13, the electric field between the first electrode 12 and the second electrode 13 is preferably 0.5 V/cm or more and 15 V/cm or less and more preferably 1 V/cm or more and 10 V/cm or less.

When the electric field between the first electrode 12 and the second electrode 13 is 0.5 V/cm or more, a pH gradient of the single-walled carbon nanotube dispersion liquid is formed in the separation tank 11, and it is possible to separate metallic single-walled carbon nanotubes and semiconducting single-walled carbon nanotubes contained in the single-walled carbon nanotube dispersion liquid. On the other hand, when the electric field between the first electrode 12 and the second electrode 13 is 15 V/cm or less, the influence of electrolysis of water or heavy water is reduced.

Here, when separation of the mixture of single-walled carbon nanotubes starts through carrier-free electrophoresis, the single-walled carbon nanotubes move in the height direction of the separation tank 11. In addition, the single-walled carbon nanotubes also move in a direction (horizontal direction) perpendicular to the height direction of the separation tank 11. A horizontal flow occurs in the single-walled carbon nanotube dispersion liquid in the separation tank 11 according to movement of the single-walled carbon nanotubes. When a horizontal flow occurs in the separation tank 11, a time required for the separation of the phase of the single-walled carbon nanotube dispersion liquid into the dispersion liquid phase A and the dispersion liquid phase B increases. In particular, when the inner diameter of the separation tank 11 increases as the volume of the separation tank 11 increases, a time required for phase separation increases. Therefore, in the nanocarbon separation method of the present example embodiment, the partition member 14 composed of the plurality of plate members 15 that are arranged in the horizontal direction of the separation tank 11 is provided in the separation tank 11, and the interior of the separation tank 11 is partitioned into a plurality of regions. Thereby, in the separation step, when the phase of the single-walled carbon nanotube dispersion liquid is separated in the separation tank 11 through carrier-free electrophoresis, the occurrence of a horizontal flow in the separation tank 11 can be inhibited. As a result, even if the separation tank 11 having a large inner diameter is used, it is possible to improve the efficiency and speed of separation of the phase of the single-walled carbon nanotube dispersion liquid into the dispersion liquid phase A and the dispersion liquid phase B.

According to the nanocarbon separation method of the present example embodiment, when the partition member 14 composed of the plurality of plate members 15 that are arranged in the horizontal direction of the separation tank 11 is provided between the first electrode 12 and the second electrode 13, the occurrence of a horizontal flow in the separation tank 11 can be inhibited. As a result, it is possible to separate metallic single-walled carbon nanotubes and semiconducting single-walled carbon nanotubes quickly and efficiently. Accordingly, it is possible to obtain highly pure metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary example of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

(Nanocarbon Recovery Method)

The nanocarbon recovery method of the present example embodiment is a nanocarbon recovery method using the nanocarbon separation device 10 of the present example embodiment, and after the separation operation according to the nanocarbon separation method using the nanocarbon separation device 10 of the present example embodiment is completed, the separated dispersion liquid phase A and dispersion liquid phase B are recovered (isolated) from the separation tank 11.

The recovery method is not particularly limited, and any method in which the dispersion liquid phase A and the dispersion liquid phase B are not mixed by diffusion may be used.

In the nanocarbon recovery method of the present example embodiment, for example, the following two methods are used as the recovery method.

Regarding the recovery method, for example, a method using the injection/recovery port 16 having the rotary cock 17 provided in the nanocarbon separation device 10 as shown in FIG. 2 may be an exemplary example.

In the recovery method, while a direct current voltage is applied to the first electrode 12 and the second electrode 13, the cock 17 is rotated so that the separation tank 11 and the injection/recovery port 16 communicate with each other, and thus the single-walled carbon nanotube dispersion liquid of the dispersion liquid phase B is continuously discharged from the injection/recovery port 16 and the single-walled carbon nanotube dispersion liquid having a large amount of semiconducting single-walled carbon nanotubes is recovered. Subsequently, the single-walled carbon nanotube dispersion liquid of the dispersion liquid phase C is continuously discharged from the injection/recovery port 16, the single-walled carbon nanotube dispersion liquid of the dispersion liquid phase A is then continuously discharged from the injection/recovery port 16, and the single-walled carbon nanotube dispersion liquid having a large amount of metallic single-walled carbon nanotubes is recovered.

Regarding the recovery method, for example, a method using the suction device 20 that is provided separately from the separation tank 11 as shown in FIG. 3 may be an exemplary example.

In the recovery method, application of a direct current voltage to the first electrode 12 and the second electrode 13 is stopped, and a small amount of the single-walled carbon nanotube dispersion liquid of each of dispersion liquid phases is sucked through the suction tube 21 composed of a microsyringe or the like from the upper part of the separation tank 11 such that the dispersion liquid phases are not disturbed.

The recovered single-walled carbon nanotube dispersion liquid is accommodated again in the separation tank 11, the operation of separating metallic single-walled carbon nanotubes and semiconducting single-walled carbon nanotubes contained in the single-walled carbon nanotube dispersion liquid through carrier-free electrophoresis is repeatedly performed in the same manner as described above, and thus it is possible to obtain highly pure metallic single-walled carbon nanotubes and semiconducting single-walled carbon nanotubes.

The separation efficiency of the recovered dispersion liquid can be evaluated through a technique such as microscopic Raman spectroscopy (change in Raman spectrums in a radial breathing mode (RBM) region, and change in a Raman spectrum shape in a Breit-Wigner-Fano (BWF) region), and ultraviolet-visible-near-infrared absorption spectrophotometry (change in peak shape of absorption spectrum). In addition, the separation efficiency of the dispersion liquid can also be evaluated by evaluating electrical properties of single-walled carbon nanotubes. For example, the separation efficiency of the dispersion liquid can be evaluated by producing a field effect transistor and measuring its transistor characteristics.

According to the nanocarbon recovery method of the present example embodiment, after the separation operation according to the nanocarbon separation method of the present example embodiment is completed, the separated metallic single-walled carbon nanotubes and semiconducting single-walled carbon nanotubes can be efficiently recovered from the separation tank 11.

Second Example Embodiment (Nanocarbon Separation Device)

Figure 5:
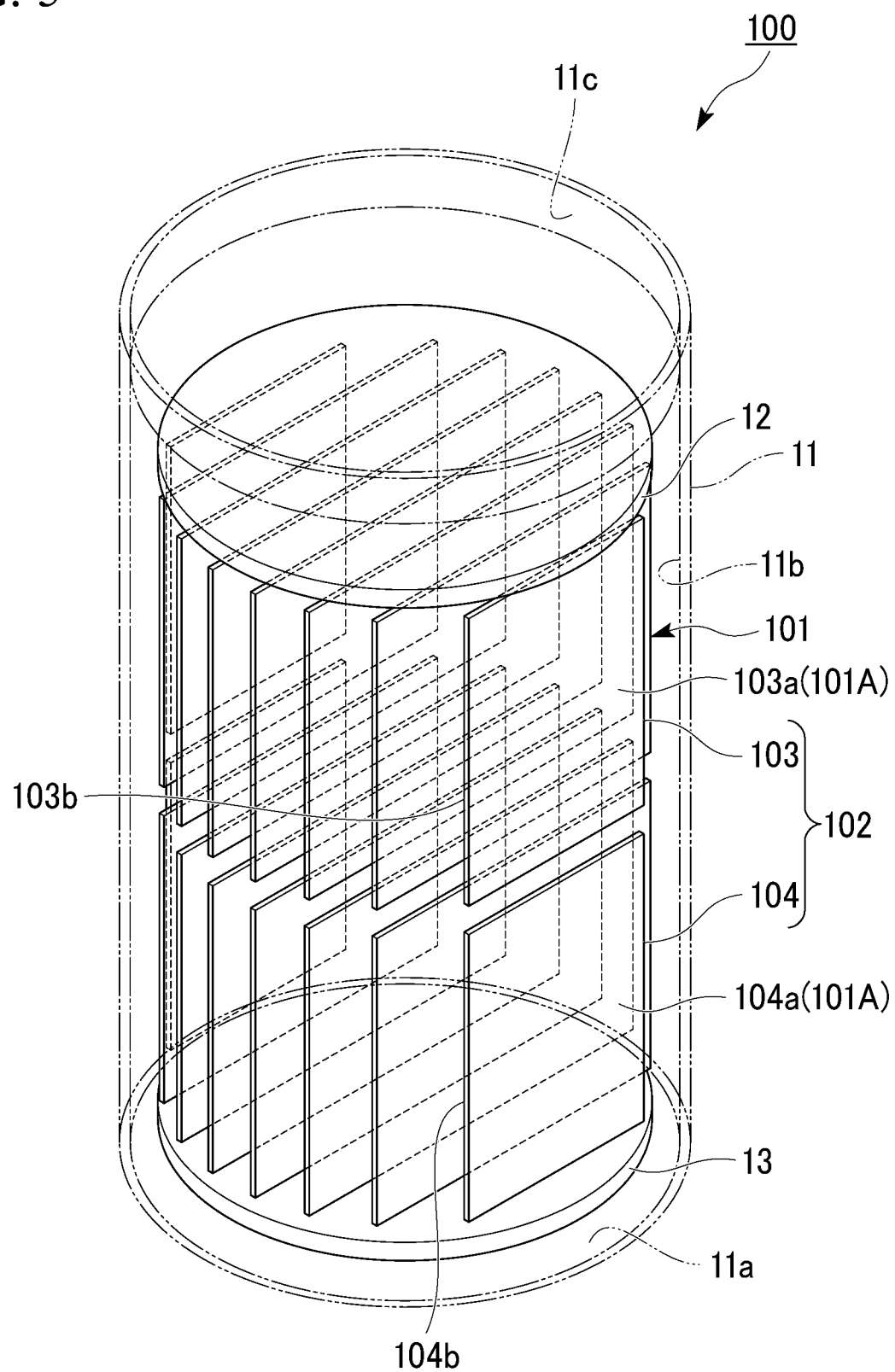
FIG. 5 is a perspective view showing a nanocarbon separation device of a second example embodiment.

FIG. 5 is a perspective view showing a nanocarbon separation device of the present example embodiment.

Here, in FIG. 5, components the same as those of the nanocarbon separation device of the first example embodiment shown in FIG. 1 will be denoted with the same reference numerals and redundant descriptions will be omitted.

A nanocarbon separation device 100 of the present example embodiment includes a separation tank (electrophoresis tank) 11, a first electrode 12 provided at an upper part in the separation tank 11, a second electrode 13 provided at a lower part in the separation tank 11, and a partition member 101 which is provided between the first electrode 12 and the second electrode 13 in the separation tank 11 and extends in the height direction of the separation tank 11.

The partition member 101 partitions the separation tank 11 into a plurality of regions. The partition member 101 has a wall 101A. The wall 101A extends in the vertical direction of the separation tank 11. The partition member 101 may have a plurality of walls 101A.

As shown in FIG. 5, the partition members 101 are a plurality of plate members 102 that are arranged in the horizontal direction of the separation tank 11. The plate member 102 extends in the vertical direction of the separation tank 11.

The partition member 101 is vertically divided in the height direction of the separation tank 11. In other words, the plate member 102 is composed of a first plate member 103 and a second plate member 104 that are vertically divided into two in the height direction of the separation tank 11. That is, the first plate member 103 and the second plate member 104 are arranged on the same plane in the height direction of the separation tank 11. The first plate member 103 is provided at an upper part in the separation tank 11, and the second plate member 104 is provided at a lower part in the separation tank 11. The position at which the plate member 102 is divided, that is, the length of the first plate member 103 and the second plate member 104 in the height direction of the separation tank 11 is not particularly limited, and is appropriately set according to the height of the dispersion liquid phase A and the dispersion liquid phase B formed in the separation tank 11 through carrier-free electrophoresis and the like. In addition, the interval between the first plate member 103 and the second plate member 104 in the height direction of the separation tank 11 is not particularly limited, and is appropriately set according to the height of the dispersion liquid phase A and the dispersion liquid phase B formed in the separation tank 11 through carrier-free electrophoresis and the like.

The first plate member 103 has one main surface 103*a*.

The second plate member 104 has one main surface 104*a*.

Thereby, the interior of the separation tank 11 is partitioned into a plurality of regions by the partition member 101.

The plate member 102 preferably includes the first plate member 103 and the second plate member 104 as one set. The plate member 102 preferably extends in a region between the first electrode 12 and the second electrode 13 in the separation tank 11 over substantially the entire region in the height direction.

The size of the first plate member 103 (the area of the one main surface 103*a*) and the size of the second plate member 104 (the area of the one main surface 104*a*, and the area of a main surface opposite to the one main surface 104*a*) are not particularly limited. However, when the first plate member 103 is disposed in the separation tank 11, one side surface 103*b* of the first plate member 103 and a side surface opposite to the one side surface 103*b* are preferably disposed near the inner surface 11*b* of the separation tank 11. Similarly, when the second plate member 104 is disposed in the separation tank 11, one side surface 104*b* of the second plate member 104 and a side surface opposite to the one side surface 104*b* are preferably disposed near the inner surface 11*b* of the separation tank 11.

The thickness of the first plate member 103 and the second plate member 104 is not particularly limited, and is appropriately adjusted according to the size of the separation tank 11, the numbers of first plate members 103 and second plate members 104 disposed in the separation tank 11, and the like.

The interval between the plate members 102 in the horizontal direction of the separation tank 11 is not particularly limited and is appropriately set according to the amount (volume) of the nanocarbon dispersion liquid 30 accommodated in the separation tank 11. In addition, the number of plate members 102 is not particularly limited, and is appropriately set according to the amount (volume) of the nanocarbon dispersion liquid 30 accommodated in the separation tank 11.

The material of the plate member 102 is not particularly limited as long as it is stable with respect to the nanocarbon dispersion liquid 30 and is an insulating material. Examples of materials of the plate member 102 include glass, quartz, and acrylic resin.

The nanocarbon separation device 100 of the present example embodiment may include an injection port (not shown) through which the nanocarbon dispersion liquid 30 is injected into the separation tank 11 as in the first example embodiment.

As in the first example embodiment, as shown in FIG. 2, the nanocarbon separation device 100 of the present example embodiment may include the injection/recovery port 16 at a lower end of the separation tank 11 through which the nanocarbon dispersion liquid 30 is injected into the separation tank 11 and the nanocarbon dispersion liquid 30 is recovered from the separation tank 11. The injection/recovery port 16 may have a rotary cock 17 having a ground glass joint.

As in the first example embodiment, as shown in FIG. 3, the nanocarbon separation device 100 of the present example embodiment may include the suction device 20 that sucks the nanocarbon dispersion liquid 30 from the upper part of the separation tank 11 separately from the separation tank 11.

As in the first example embodiment, the nanocarbon separation device 100 of the present example embodiment preferably includes a temperature adjusting unit for keeping the temperature of the nanocarbon dispersion liquid 30 in the separation tank 11 constant.

According to the nanocarbon separation device 100 of the present example embodiment, when the partition member 101 composed of the plurality of plate members 102 that are arranged in the horizontal direction of the separation tank 11 is provided between the first electrode 12 and the second electrode 13, for example, in a step of separating metallic nanocarbons and semiconducting nanocarbons contained in the nanocarbon dispersion liquid 30 which is performed in a nanocarbon separation method to be described below, it is possible to inhibit the occurrence of a horizontal flow in the nanocarbon dispersion liquid 30 in the separation tank 11 and the occurrence of disturbance due to convection of the nanocarbon dispersion liquid 30 and the like. Therefore, it is possible to separate metallic nanocarbons and semiconducting nanocarbons quickly and efficiently. As a result, it is possible to separate metallic nanocarbons and semiconducting nanocarbons quickly and efficiently. Accordingly, it is possible to obtain highly pure metallic nanocarbons and semiconducting nanocarbons.

(Nanocarbon Separation Method)

A nanocarbon separation method using the nanocarbon separation device 100 will be described and also operations of the nanocarbon separation device 100 will be described with reference to FIG. 5.

As in the first example embodiment, the nanocarbon separation method of the present example embodiment includes a step of injecting the nanocarbon dispersion liquid 30 into the separation tank 11 (injection step) and a step of separating metallic nanocarbons and semiconducting nanocarbons contained in the nanocarbon dispersion liquid 30 by applying a direct current voltage to the first electrode 12 and the second electrode 13 (separation step).

In the injection step, when the nanocarbon dispersion liquid 30 is injected into the separation tank 11, the first electrode 12 and the second electrode 13 are brought into contact with the nanocarbon dispersion liquid 30. In the present example embodiment, the first electrode 12 and the second electrode 13 are immersed in the nanocarbon dispersion liquid 30.

In the nanocarbon separation method of the present example embodiment, the partition member 101 including the plurality of plate members 102 that are arranged in the horizontal direction of the separation tank 11 is provided between the first electrode 12 and the second electrode 13 in the separation tank 11, and the interior of the separation tank 11 is partitioned into a plurality of regions. Thereby, in the separation step, when the phase of the nanocarbon dispersion liquid 30 is separated through carrier-free electrophoresis, the occurrence of a horizontal flow in the separation tank 11 can be inhibited. As a result, even if the separation tank 11 having a large inner diameter is used, it is possible to improve the speed or efficiency of separation of the phase of the nanocarbon dispersion liquid 30 into the dispersion liquid phase A and the dispersion liquid phase B.

According to the nanocarbon separation method using the nanocarbon separation device 100 of the present example embodiment, when the partition member 101 including the plurality of plate members 102 that are arranged in the horizontal direction of the separation tank 11 is provided between the first electrode 12 and the second electrode 13, the occurrence of a horizontal flow in the separation tank 11 can be inhibited. As a result, it is possible to separate metallic single-walled carbon nanotubes and semiconducting single-walled carbon nanotubes quickly and efficiently. Accordingly, it is possible to obtain highly pure metallic single-walled carbon nanotubes and semiconducting single-walled carbon nanotubes.

In the nanocarbon separation method of the present example embodiment, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

(Nanocarbon Recovery Method)

The nanocarbon recovery method of the present example embodiment is a nanocarbon recovery method using the nanocarbon separation device 100 of the present example embodiment, and after the separation operation according to the nanocarbon separation method using the nanocarbon separation device 100 of the present example embodiment is completed, the separated dispersion liquid phase A and dispersion liquid phase B are recovered (isolated) from the separation tank 11.

The recovery method is not particularly limited, and any method in which the dispersion liquid phase A and the dispersion liquid phase B are not mixed by diffusion may be used.

In the nanocarbon recovery method of the present example embodiment, for example, the same method as in the first example embodiment is used as the recovery method.

In addition, regarding the recovery method, for example, a method in which a partition plate or the like is inserted between the first member 103 and the second member 104, and the dispersion liquid phase A on the side of the first member 103 and the dispersion liquid phase B on the side of the second member 104 are recovered may be used.

In addition, as in the first example embodiment, the recovered dispersion liquid is accommodated again in the separation tank 11 and the operation of separating metallic single-walled carbon nanotubes and semiconducting single-walled carbon nanotubes contained in the nanocarbon dispersion liquid 30 through carrier-free electrophoresis may be repeatedly performed.

The separation efficiency of the recovered dispersion liquid can be evaluated as in the first example embodiment.

According to the nanocarbon recovery method of the present example embodiment, after the separation operation according to the nanocarbon separation method of the present example embodiment is completed, the separated metallic single-walled carbon nanotubes and semiconducting single-walled carbon nanotubes can be efficiently recovered from the separation tank 11.

Third Example Embodiment (Nanocarbon Separation Device)

Figure 6:
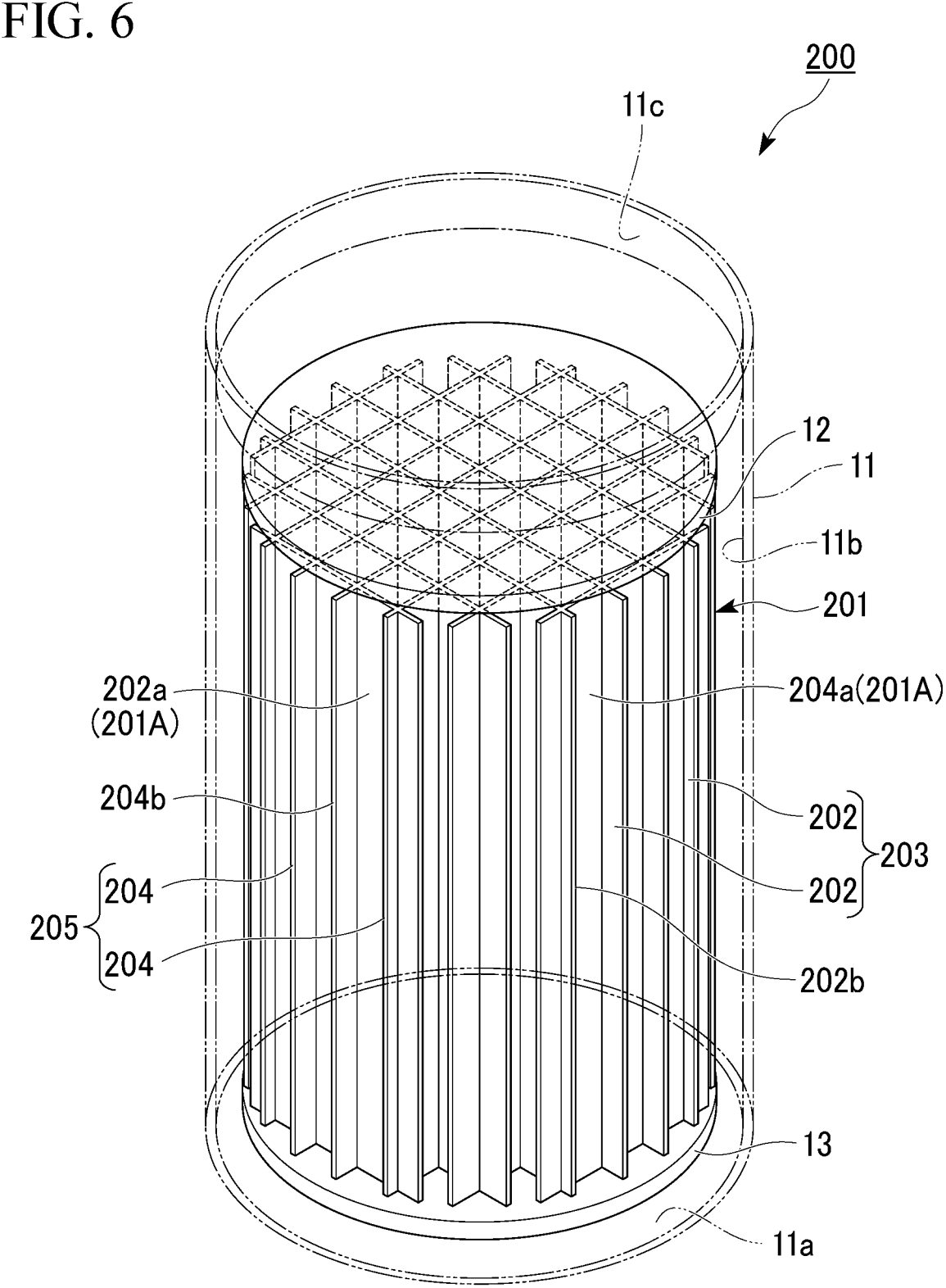
FIG. 6 is a perspective view showing a third nanocarbon separation device.

FIG. 6 is a perspective view showing a nanocarbon separation device of the present example embodiment.

Here, in FIG. 6, components the same as those of the nanocarbon separation device of the first example embodiment shown in FIG. 1 will be denoted with the same reference numerals and redundant descriptions will be omitted.

A nanocarbon separation device 200 of the present example embodiment includes a separation tank (electrophoresis tank) 11, a first electrode 12 provided at an upper part in the separation tank 11, a second electrode 13 provided at a lower part in the separation tank 11, and a partition member 201 that is provided between the first electrode 12 and the second electrode 13 in the separation tank 11 and extends in the height direction of the separation tank 11.

The partition member 201 partitions the separation tank 11 into a plurality of regions. The partition member 201 has a wall 201A. The wall 201A extends in the vertical direction of the separation tank 11. The partition member 201 may have a plurality of walls 201A.

As shown in FIG. 6, the partition member 201 includes a first plate member group 203 including a plurality of first plate members 202 that are arranged in the horizontal direction of the separation tank 11 and a second plate member group 205 which vertically intersects the first plate member group 203 and includes a plurality of second plate members 204 that are arranged in the horizontal direction of the separation tank 11. Thereby, the interior of the separation tank 11 is partitioned into a plurality of regions by the partition member 201. In other words, the separation tank 11 is partitioned into a grid space in a plan view. In addition, the first plate member 202 and the second plate member 204 extend in the vertical direction of the separation tank 11.

The first plate member 202 has one main surface 202a. The one main surface 202a of the first plate member 202 is the wall 201A of the partition member 201.

The second plate member 204 has one main surface 204a. The one main surface 204a of the second plate member 204 is the wall 201A of the partition member 201.

The first plate member 202 and the second plate member 204 preferably extend in a region between the first electrode 12 and the second electrode 13 in the separation tank 11 over substantially the entire space in the height direction.

The size of the first plate member 202 (the area of the one main surface 202a, and the area of a main surface opposite to the one main surface 202a) is not particularly limited, and when the first plate member 202 is disposed in the separation tank 11, one side surface 202b of the first plate member 202 and a side surface opposite to the one side surface 202b are preferably disposed near the inner surface 11b of the separation tank 11.

The thickness of the first plate member 202 is not particularly limited, and is appropriately adjusted according to the size of the separation tank 11, the number of first plate members 202 disposed in the separation tank 11, and the like.

In addition, the size of the second plate member 204 (the area of the one main surface 204a, and the area of a main surface opposite to the one main surface 204a) is not particularly limited, and when the second plate member 204 is disposed in the separation tank 11, one side surface 204b of the second plate member 204 and a side surface opposite to the one side surface 204b are preferably disposed near the inner surface 11b of the separation tank 11.

The thickness of the second plate member 204 is not particularly limited and is appropriately adjusted according to the size of the separation tank 11, the number of second plate members 204 disposed in the separation tank 11, and the like.

The interval between the first plate members 202 in the horizontal direction of the separation tank 11 and the interval between the second plate members 204 in the horizontal direction of the separation tank 11 are not particularly limited, and are appropriately set according to the amount (volume) of the nanocarbon dispersion liquid 30 accommodated in the separation tank 11. In addition, the numbers of first plate members 202 and second plate members 204 are not particularly limited, and are appropriately set according to the amount (volume) of the nanocarbon dispersion liquid 30 accommodated in the separation tank 11.

The material of the first plate member 202 and the second plate member 204 is not particularly limited as long as it is stable with respect to the nanocarbon dispersion liquid 30 and is an insulating material. Examples of materials of the first plate member 202 and the second plate member 204 include glass, quartz, and acrylic resin.

The nanocarbon separation device 200 of the present example embodiment may include an injection port (not shown) through which the nanocarbon dispersion liquid 30 is injected into the separation tank 11 as in the first example embodiment.

As in the first example embodiment, as shown in FIG. 2, the nanocarbon separation device 200 of the present example embodiment may include the injection/recovery port 16 at a lower end of the separation tank 11 through which the nanocarbon dispersion liquid 30 is injected into the separation tank 11 and the nanocarbon dispersion liquid 30 is recovered from the separation tank 11. The injection/recovery port 16 may have a rotary cock 17 having a ground glass joint.

As in the first example embodiment, as shown in FIG. 3, the nanocarbon separation device 200 of the present example embodiment may include the suction device 20 that sucks the nanocarbon dispersion liquid 30 from the upper part of the separation tank 11 separately from the separation tank 11.

As in the first example embodiment, the nanocarbon separation device 200 of the present example embodiment preferably includes a temperature adjusting unit for keeping the temperature of the nanocarbon dispersion liquid 30 in the separation tank 11 constant.

In the nanocarbon separation device 200 of the present example embodiment, as in the second example embodiment, the partition member 201 may be vertically divided in the height direction of the separation tank 11. In other words, the first plate member 202 and the second plate member 204 may be vertically divided into two in the height direction of the separation tank 11.

While a case in which the first plate member 202 and the second plate member 204 vertically intersect has been provided as an exemplary example of the nanocarbon separation device 200 of the present example embodiment, the present example embodiment is not limited thereto. In the nanocarbon separation device 200 of the present example embodiment, the first plate member 202 and the second plate member 204 may obliquely intersect.

According to the nanocarbon separation device 200 of the present example embodiment, when the partition member 201 composed of the plurality of first plate members 202 and the plurality of second plate members 204 that are arranged in the horizontal direction of the separation tank 11 is provided between the first electrode 12 and the second electrode 13, for example, in a step of separating metallic nanocarbons and semiconducting nanocarbons contained in the nanocarbon dispersion liquid 30 which is performed in a nanocarbon separation method to be described below, it is possible to inhibit the occurrence of a horizontal flow in the nanocarbon dispersion liquid 30 in the separation tank 11 and the occurrence of disturbance due to convection of the nanocarbon dispersion liquid 30 and the like. Therefore, it is possible to separate metallic nanocarbons and semiconducting nanocarbons quickly and efficiently. As a result, it is possible to separate metallic nanocarbons and semiconducting nanocarbons quickly and efficiently. Accordingly, it is possible to obtain highly pure metallic nanocarbons and semiconducting nanocarbons.

(Nanocarbon Separation Method)

A nanocarbon separation method using the nanocarbon separation device 200 will be described and also operations of the nanocarbon separation device 200 will be described with reference to FIG. 6.

As in the first example embodiment, the nanocarbon separation method of the present example embodiment includes a step of injecting the nanocarbon dispersion liquid 30 into the separation tank 11 (injection step) and a step of separating metallic nanocarbons and semiconducting nanocarbons contained in the nanocarbon dispersion liquid 30 by applying a direct current voltage to the first electrode 12 and the second electrode 13 (separation step).

In the injection step, when the nanocarbon dispersion liquid 30 is injected into the separation tank 11, the first electrode 12 and the second electrode 13 are brought into contact with the nanocarbon dispersion liquid 30. In the present example embodiment, the first electrode 12 and the second electrode 13 are immersed in the nanocarbon dispersion liquid 30.

In the nanocarbon separation method of the present example embodiment, the partition member 201 including the first plate member group 203 including the plurality of first plate members 202 that are arranged in the horizontal direction of the separation tank 11 and the second plate member group 205 which vertically intersects the first plate member group 203 and includes the plurality of second plate members 204 that are arranged in the horizontal direction of the separation tank 11 is provided between the first electrode 12 and the second electrode 13 in the separation tank 11, and the interior of the separation tank 11 is partitioned into a plurality of regions. Thereby, in the separation step, when the phase of the nanocarbon dispersion liquid 30 is separated in the separation tank 11 through carrier-free electrophoresis, the occurrence of a horizontal flow in the nanocarbon dispersion liquid 30 can be inhibited. As a result, even if the separation tank 11 having a large inner diameter is used, it is possible to improve the speed or efficiency of separation of the phase of the nanocarbon dispersion liquid 30 into the dispersion liquid phase A and the dispersion liquid phase B quickly and efficiently.

According to the nanocarbon separation method using the nanocarbon separation device 200 of the present example embodiment, when the partition member 201 including the first plate member group 203 including the plurality of first plate members 202 that are arranged in the horizontal direction of the separation tank 11 and the second plate member group 205 which vertically intersects the first plate member group 203 and includes the plurality of second plate members 204 that are arranged in the horizontal direction of the separation tank 11 is provided between the first electrode 12 and the second electrode 13, the occurrence of a horizontal flow in the separation tank 11 can be inhibited. As a result, it is possible to separate metallic single-walled carbon nanotubes and semiconducting single-walled carbon nanotubes quickly and efficiently. Accordingly, it is possible to obtain highly pure metallic single-walled carbon nanotubes and semiconducting single-walled carbon nanotubes.

In the nanocarbon separation method of the present example embodiment, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

(Nanocarbon Recovery Method)

The nanocarbon recovery method of the present example embodiment is a nanocarbon recovery method using the nanocarbon separation device 200 of the present example embodiment, and after the separation operation according to the nanocarbon separation method using the nanocarbon separation device 200 of the present example embodiment is completed, the separated dispersion liquid phase A and dispersion liquid phase B are recovered (isolated) from the separation tank 11.

The recovery method is not particularly limited, and any method in which the dispersion liquid phase A and the dispersion liquid phase B are not mixed by diffusion may be used.

In the nanocarbon recovery method of the present example embodiment, for example, the same method as in the first example embodiment is used as the recovery method.

In addition, as in the second example embodiment, when the partition member 201 is vertically divided in the height direction of the separation tank 11, regarding the recovery method, for example, a method in which a partition plate or the like is inserted between the vertically divided partition members 201, and the dispersion liquid phase A on the side of the partition member 201 disposed at an upper part in the separation tank 11 and the dispersion liquid phase B on the side of the partition member 201 disposed at a lower part in the separation tank 11 are recovered may be used.

In addition, as in the first example embodiment, the recovered dispersion liquid is accommodated again in the separation tank 11 and the operation of separating metallic single-walled carbon nanotubes and semiconducting single-walled carbon nanotubes contained in the nanocarbon dispersion liquid 30 through carrier-free electrophoresis may be repeatedly performed.

The separation efficiency of the recovered dispersion liquid can be evaluated as in the first example embodiment.

According to the nanocarbon recovery method of the present example embodiment, after the separation operation according to the nanocarbon separation method of the present example embodiment is completed, the separated metallic single-walled carbon nanotubes and semiconducting single-walled carbon nanotubes can be efficiently recovered from the separation tank 11.

Fourth Example Embodiment (Nanocarbon Separation Device)

Figure 7:
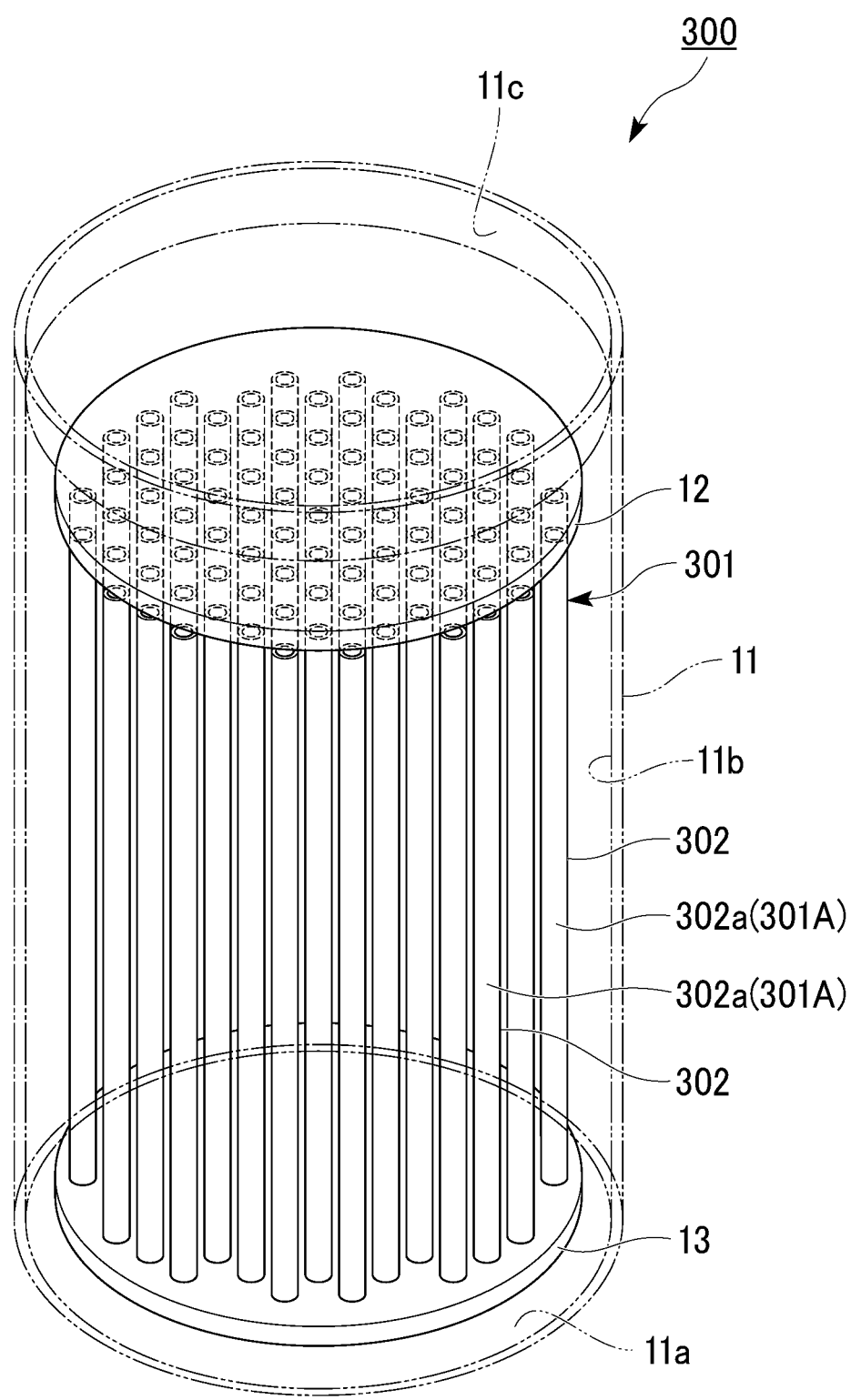
FIG. 7 is a perspective view showing a nanocarbon separation device of a fourth example embodiment.

FIG. 7 is a perspective view showing a nanocarbon separation device of the present example embodiment.

Here, in FIG. 7, components the same as those of the nanocarbon separation device of the first example embodiment shown in FIG. 1 will be denoted with the same reference numerals and redundant descriptions will be omitted.

A nanocarbon separation device 300 of the present example embodiment includes a separation tank (electrophoresis tank) 11, a first electrode 12 provided at an upper part in the separation tank 11, a second electrode 13 provided at a lower part in the separation tank 11, and a partition member 301 that is provided between the first electrode 12 and the second electrode 13 in the separation tank 11 and extends in the height direction of the separation tank 11.

The partition member 301 partitions the separation tank 11 into a plurality of regions. The partition member 301 has a plurality of walls 301A. The wall 301A extends in the vertical direction of the separation tank 11. The partition member 301 may have a plurality of walls 301A.

As shown in FIG. 7, the partition members 301 are a plurality of tubular members 302 that are arranged in the horizontal direction of the separation tank 11. Thereby, the interior of the separation tank 11 is partitioned into a plurality of regions by the partition member 301. More specifically, the interior of the separation tank 11 is partitioned into a plurality of regions by a region formed by the plurality of tubular members 302 and the separation tank 11 and a region in the tubular member 302. In addition, the tubular member 302 extends in the vertical direction of the separation tank 11.

The tubular member 302 has a surface 302a. The surface 302a of the tubular member 302 is the wall 301A of the partition member 301.

The tubular member 302 preferably extends in a space between the first electrode 12 and the second electrode 13 in the separation tank 11 over substantially the entire space in the height direction.

The outer diameter (the maximum length in a cross section perpendicular to the tubular member 302 in the longitudinal direction) of the tubular member 302 is not particularly limited, and is appropriately set according to the amount (volume) of the nanocarbon dispersion liquid 30 accommodated in the separation tank 11.

The interval between the tubular members 302 in the horizontal direction of the separation tank 11 is not particularly limited, and is appropriately set according to the amount (volume) of the nanocarbon dispersion liquid 30 accommodated in the separation tank 11. The tubular members 302 are preferably arranged at equal intervals in the separation tank 11.

In addition, the number of tubular members 302 is not particularly limited, and is appropriately set according to the amount (volume) of the nanocarbon dispersion liquid 30 accommodated in the separation tank 11.

The structure of the tubular member 302 is not particularly limited. Examples of structures of the tubular member 302 include a columnar shape, a triangular columnar shape, a square columnar shape, and a polygonal columnar shape with five sides or more.

The material of the tubular member 302 is not particularly limited as long as it is stable with respect to the nanocarbon dispersion liquid 30 and is an insulating material. Examples of materials of the tubular member 302 include glass, quartz, and acrylic resin.

The nanocarbon separation device 300 of the present example embodiment may include an injection port (not shown) through which the nanocarbon dispersion liquid 30 is injected into the separation tank 11 as in the first example embodiment.

As in the first example embodiment, as shown in FIG. 2, the nanocarbon separation device 300 of the present example embodiment may include the injection/recovery port 16 at a lower end of the separation tank 11 through which the nanocarbon dispersion liquid 30 is injected into the separation tank 11 and the nanocarbon dispersion liquid 30 is recovered from the separation tank 11. The injection/recovery port 16 may have a rotary cock 17 having a ground glass joint.

As in the first example embodiment, as shown in FIG. 3, the nanocarbon separation device 300 of the present example embodiment may include the suction device 20 that sucks the nanocarbon dispersion liquid 30 from the upper part of the separation tank 11 separately from the separation tank 11.

As in the first example embodiment, the nanocarbon separation device 300 of the present example embodiment preferably includes a temperature adjusting unit for keeping the temperature of the nanocarbon dispersion liquid 30 in the separation tank 11 constant.

In the nanocarbon separation device 300 of the present example embodiment, as in the second example embodiment, the partition member 301 may be vertically divided in the height direction of the separation tank 11. In other words, the tubular member 302 may be vertically divided into two in the height direction of the separation tank 11.

According to the nanocarbon separation device 300 of the present example embodiment, when the plurality of tubular members 302 that are arranged in the horizontal direction of the separation tank 11 is provided between the first electrode 12 and the second electrode 13, for example, in a step of separating metallic nanocarbons and semiconducting nanocarbons contained in the nanocarbon dispersion liquid 30 which is performed in a nanocarbon separation method to be described below, it is possible to inhibit the occurrence of a horizontal flow in the nanocarbon dispersion liquid 30 in the separation tank 11 and the occurrence of disturbance due to convection of the nanocarbon dispersion liquid 30 and the like. Therefore, it is possible to separate metallic nanocarbons and semiconducting nanocarbons quickly and efficiently. As a result, it is possible to separate metallic nanocarbons and semiconducting nanocarbons quickly and efficiently. Accordingly, it is possible to obtain highly pure metallic nanocarbons and semiconducting nanocarbons.

(Nanocarbon Separation Method)

A nanocarbon separation method using the nanocarbon separation device 300 will be described and also operations of the nanocarbon separation device 300 will be described with reference to FIG. 7.

As in the first example embodiment, the nanocarbon separation method of the present example embodiment includes a step of injecting the nanocarbon dispersion liquid 30 into the separation tank 11 (injection step) and a step of separating metallic nanocarbons and semiconducting nanocarbons contained in the nanocarbon dispersion liquid 30 by applying a direct current voltage to the first electrode 12 and the second electrode 13 (separation step).

In the injection step, when the nanocarbon dispersion liquid 30 is injected into the separation tank 11, the first electrode 12 and the second electrode 13 are brought into contact with the nanocarbon dispersion liquid 30. In the present example embodiment, the first electrode 12 and the second electrode 13 are immersed in the nanocarbon dispersion liquid 30.

In the nanocarbon separation method of the present example embodiment, the partition member 301 including the plurality of tubular members 302 that are arranged in the horizontal direction of the separation tank 11 is provided between the first electrode 12 and the second electrode 13 in the separation tank 11, and the interior of the separation tank 11 is partitioned into a plurality of regions. Thereby, in the separation step, when the phase of the nanocarbon dispersion liquid 30 is separated in the separation tank 11 through carrier-free electrophoresis, the occurrence of a horizontal flow in the nanocarbon dispersion liquid 30 can be inhibited. As a result, even if the separation tank 11 having a large inner diameter is used, it is possible to improve the speed or efficiency of separation of the phase of the nanocarbon dispersion liquid 30 into the dispersion liquid phase A and the dispersion liquid phase B quickly and efficiently.

According to the nanocarbon separation method using the nanocarbon separation device 300 of the present example embodiment, when the partition member 301 including the plurality of tubular members 302 that are arranged in the horizontal direction of the separation tank 11 is provided between the first electrode 12 and the second electrode 13, the occurrence of a horizontal flow in the separation tank 11 can be inhibited. As a result, it is possible to separate metallic single-walled carbon nanotubes and semiconducting single-walled carbon nanotubes quickly and efficiently. Accordingly, it is possible to obtain highly pure metallic single-walled carbon nanotubes and semiconducting single-walled carbon nanotubes.

In the nanocarbon separation method of the present example embodiment, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

(Nanocarbon Recovery Method)

The nanocarbon recovery method of the present example embodiment is a nanocarbon recovery method using the nanocarbon separation device 300 of the present example embodiment, and after the separation operation according to the nanocarbon separation method using the nanocarbon separation device 300 of the present example embodiment is completed, the separated dispersion liquid phase A and dispersion liquid phase B are recovered (isolated) from the separation tank 11.

The recovery method is not particularly limited, and any method in which the dispersion liquid phase A and the dispersion liquid phase B are not mixed by diffusion may be used.

In the nanocarbon recovery method of the present example embodiment, for example, the same method as in the first example embodiment is used as the recovery method.

In addition, as in the second example embodiment, when the partition member 301 is vertically divided in the height direction of the separation tank 11, regarding the recovery method, for example, a method in which a partition plate or the like is inserted between the vertically divided partition members 301, and the dispersion liquid phase A on the side of the partition member 301 disposed at an upper part in the separation tank 11 and the dispersion liquid phase B on the side of the partition member 301 disposed at a lower part in the separation tank 11 are recovered may be used.

In addition, as in the first example embodiment, the recovered dispersion liquid is accommodated again in the separation tank 11 and the operation of separating metallic single-walled carbon nanotubes and semiconducting single-walled carbon nanotubes contained in the nanocarbon dispersion liquid 30 through carrier-free electrophoresis may be repeatedly performed.

The separation efficiency of the recovered dispersion liquid can be evaluated as in the first example embodiment.

According to the nanocarbon recovery method of the present example embodiment, after the separation operation according to the nanocarbon separation method of the present example embodiment is completed, the separated metallic single-walled carbon nanotubes and semiconducting single-walled carbon nanotubes can be efficiently recovered from the separation tank 11.

Fifth Example Embodiment (Nanocarbon Separation Device)

Figure 8:
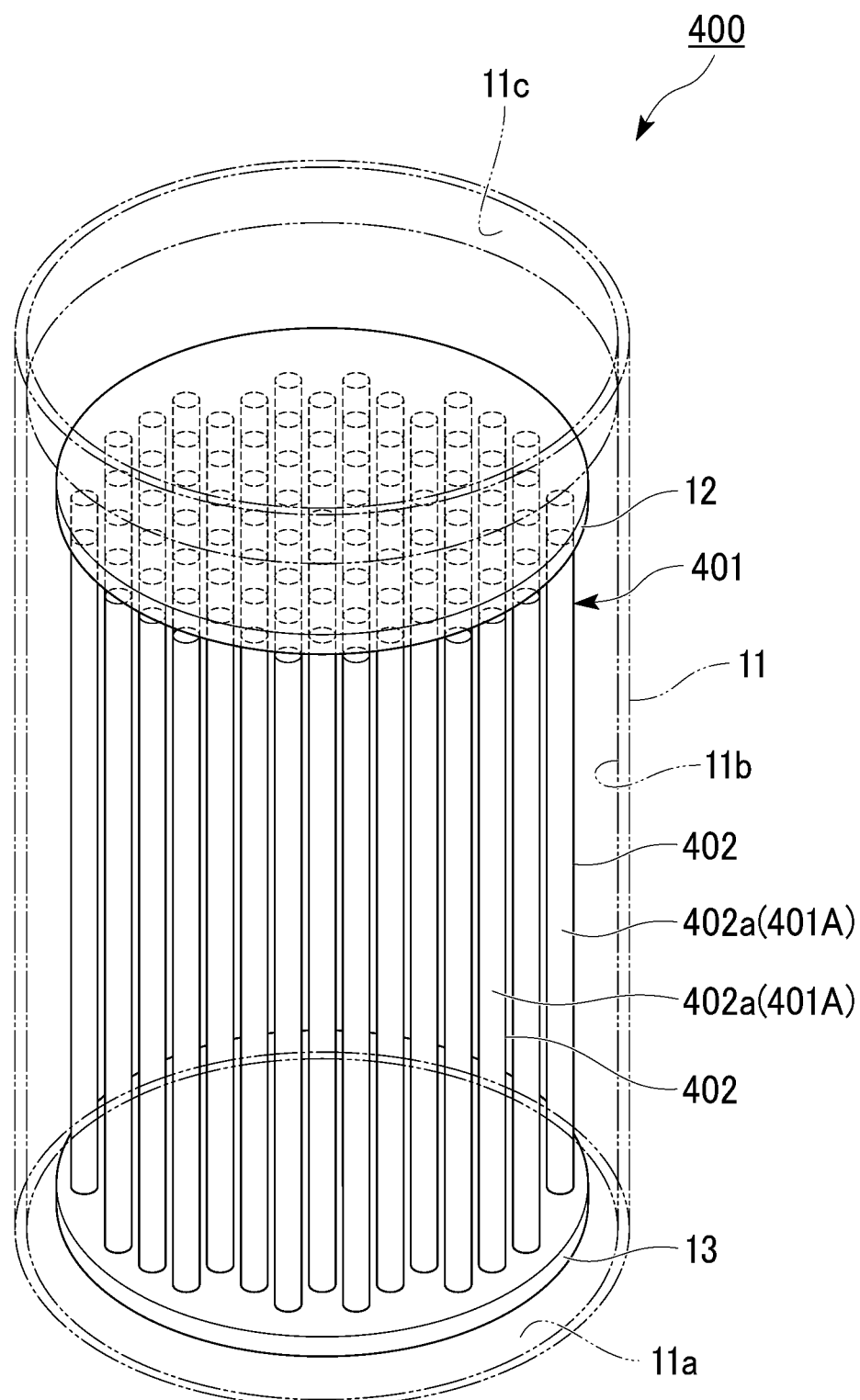
FIG. 8 is a perspective view showing a nanocarbon separation device of a fifth example embodiment.

FIG. 8 is a perspective view showing a nanocarbon separation device of the present example embodiment.

Here, in FIG. 8, components the same as those of the nanocarbon separation device of the first example embodiment shown in FIG. 1 will be denoted with the same reference numerals and redundant descriptions will be omitted.

The nanocarbon separation device 400 of the present example embodiment includes a separation tank (electrophoresis tank) 11, a first electrode 12 provided at an upper part in the separation tank 11, a second electrode 13 provided at a lower part in the separation tank 11, and a partition member 401 that is provided between the first electrode 12 and the second electrode 13 in the separation tank 11 and extends in the height direction of the separation tank 11.

The partition member 401 partitions the separation tank 11 into a plurality of regions. The partition member 401 has a plurality of walls 401A. The wall 401A extends in the vertical direction of the separation tank 11. The partition member 401 may have a plurality of walls 401A.

As shown in FIG. 8, the partition members 401 are a plurality of columnar members 402 that are arranged in the horizontal direction of the separation tank 11. Thereby, the interior of the separation tank 11 is partitioned into a plurality of spaces by the partition member 401. In addition, the columnar member 402 extends in the vertical direction of the separation tank 11.

The columnar member 402 has a surface 402a. The surface 402a of the columnar member 402 is the wall 401A of the partition member 401.

The columnar member 402 preferably extends in a space between the first electrode 12 and the second electrode 13 in the separation tank 11 over substantially the entire space in the height direction.

The outer diameter (the maximum length in a cross section perpendicular to the columnar member 402 in the longitudinal direction) of the columnar member 402 is not particularly limited, and is appropriately set according to the amount (volume) of the nanocarbon dispersion liquid 30 accommodated in the separation tank 11.

The interval between the columnar members 402 in the horizontal direction of the separation tank 11 is not particularly limited, and is appropriately set according to the amount (volume) of the nanocarbon dispersion liquid 30 accommodated in the separation tank 11. The columnar members 402 are preferably arranged at equal intervals in the separation tank 11.

In addition, the number of columnar members 402 is not particularly limited, and is appropriately set according to the amount (volume) of the nanocarbon dispersion liquid 30 accommodated in the separation tank 11.

The structure of the columnar member 402 is not particularly limited. Examples of structures of the columnar member 402 include a columnar shape, a triangular columnar shape, a quadrangular columnar shape, and a polygonal columnar shape with five sides or more.

The material of the columnar member 402 is not particularly limited as long as it is stable with respect to the nanocarbon dispersion liquid 30 and is an insulating material. Examples of materials of the columnar member 402 include glass, quartz, and acrylic resin.

The nanocarbon separation device 400 of the present example embodiment may include an injection port (not shown) through which the nanocarbon dispersion liquid 30 is injected into the separation tank 11 as in the first example embodiment.

As in the first example embodiment, as shown in FIG. 2, the nanocarbon separation device 400 of the present example embodiment may include the injection/recovery port 16 at a lower end of the separation tank 11 through which the nanocarbon dispersion liquid 30 is injected into the separation tank 11 and the nanocarbon dispersion liquid 30 is recovered from the separation tank 11. The injection/recovery port 16 may have a rotary cock 17 having a ground glass joint.

As in the first example embodiment, as shown in FIG. 3, the nanocarbon separation device 400 of the present example embodiment may include the suction device 20 that sucks the nanocarbon dispersion liquid 30 from the upper part of the separation tank 11 separately from the separation tank 11.

As in the first example embodiment, the nanocarbon separation device 400 of the present example embodiment preferably includes a temperature adjusting unit for keeping the temperature of the nanocarbon dispersion liquid 30 in the separation tank 11 constant.

In the nanocarbon separation device 400 of the present example embodiment, as in the second example embodiment, the partition member 401 may be vertically divided in the height direction of the separation tank 11. In other words, the columnar member 402 may be vertically divided into two in the height direction of the separation tank 11.

According to the nanocarbon separation device 400 of the present example embodiment, when the plurality of columnar members 402 that are arranged in the horizontal direction of the separation tank 11 are provided between the first electrode 12 and the second electrode 13, for example, in a step of separating metallic nanocarbons and semiconducting nanocarbons contained in the nanocarbon dispersion liquid 30 which is performed in a nanocarbon separation method to be described below, it is possible to inhibit the occurrence of a horizontal flow in the nanocarbon dispersion liquid 30 in the separation tank 11 and the occurrence of disturbance due to convection of the nanocarbon dispersion liquid 30 and the like. Therefore, it is possible to separate metallic nanocarbons and semiconducting nanocarbons quickly and efficiently. As a result, it is possible to separate metallic nanocarbons and semiconducting nanocarbons quickly and efficiently. Accordingly, it is possible to obtain highly pure metallic nanocarbons and semiconducting nanocarbons.

(Nanocarbon Separation Method)

A nanocarbon separation method using the nanocarbon separation device 400 will be described and also operations of the nanocarbon separation device 400 will be described with reference to FIG. 8.

As in the first example embodiment, the nanocarbon separation method of the present example embodiment includes a step of injecting the nanocarbon dispersion liquid 30 into the separation tank 11 (injection step) and a step of separating metallic nanocarbons and semiconducting nanocarbons contained in the nanocarbon dispersion liquid 30 by applying a direct current voltage to the first electrode 12 and the second electrode 13 (separation step).

In the injection step, when the nanocarbon dispersion liquid 30 is injected into the separation tank 11, the first electrode 12 and the second electrode 13 are brought into contact with the nanocarbon dispersion liquid 30. In the present example embodiment, the first electrode 12 and the second electrode 13 are immersed in the nanocarbon dispersion liquid 30.

In the nanocarbon separation method of the present example embodiment, the partition member 401 including the plurality of columnar members 402 that are arranged in the horizontal direction of the separation tank 11 is provided between the first electrode 12 and the second electrode 13 in the separation tank 11, and the interior of the separation tank 11 is partitioned into a plurality of spaces. Thereby, in the separation step, when the phase of the nanocarbon dispersion liquid 30 is separated in the separation tank 11 through carrier-free electrophoresis, the occurrence of a horizontal flow in the nanocarbon dispersion liquid 30 can be inhibited. As a result, even if the separation tank 11 having a large inner diameter is used, it is possible to improve the speed or efficiency of separation of the phase of the nanocarbon dispersion liquid 30 into the dispersion liquid phase A and the dispersion liquid phase B quickly and efficiently.

According to the nanocarbon separation method using the nanocarbon separation device 400 of the present example embodiment, when the partition member 401 including the plurality of columnar members 402 that are arranged in the horizontal direction of the separation tank 11 is provided between the first electrode 12 and the second electrode 13, the occurrence of a horizontal flow in the separation tank 11 can be inhibited. As a result, it is possible to separate metallic single-walled carbon nanotubes and semiconducting single-walled carbon nanotubes quickly and efficiently. Accordingly, it is possible to obtain highly pure metallic single-walled carbon nanotubes and semiconducting single-walled carbon nanotubes.

In the nanocarbon separation method of the present example embodiment, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

(Nanocarbon Recovery Method)

The nanocarbon recovery method of the present example embodiment is a nanocarbon recovery method using the nanocarbon separation device 400 of the present example embodiment, and after the separation operation according to the nanocarbon separation method using the nanocarbon separation device 400 of the present example embodiment is completed, the separated dispersion liquid phase A and dispersion liquid phase B are recovered (isolated) from the separation tank 11.

The recovery method is not particularly limited, and any method in which the dispersion liquid phase A and the dispersion liquid phase B are not mixed by diffusion may be used.

In the nanocarbon recovery method of the present example embodiment, for example, the same method as in the first example embodiment is used as the recovery method.

In addition, as in the second example embodiment, when the partition member 401 is vertically divided in the height direction of the separation tank 11, regarding the recovery method, for example, a method in which a partition plate or the like is inserted between the vertically divided partition members 401, and the dispersion liquid phase A on the side of the partition member 401 disposed at an upper part in the separation tank 11 and the dispersion liquid phase B on the side of the partition member 401 disposed at a lower part in the separation tank 11 are recovered may be used.

In addition, as in the first example embodiment, the recovered dispersion liquid is accommodated again in the separation tank 11 and the operation of separating metallic single-walled carbon nanotubes and semiconducting single-walled carbon nanotubes contained in the nanocarbon dispersion liquid 30 through carrier-free electrophoresis may be repeatedly performed.

The separation efficiency of the recovered dispersion liquid can be evaluated as in the first example embodiment.

According to the nanocarbon recovery method of the present example embodiment, after the separation operation according to the nanocarbon separation method of the present example embodiment is completed, the separated metallic single-walled carbon nanotubes and semiconducting single-walled carbon nanotubes can be efficiently recovered from the separation tank 11.

Sixth Example Embodiment (Nanocarbon Separation Method)

A nanocarbon separation method using the nanocarbon separation device 10 will be described with reference to FIG. 9.

First, water, a single-walled carbon nanotube dispersion liquid in which a mixture of single-walled carbon nanotubes is dispersed in an aqueous solution in which a non-ionic surfactant is dissolved, and an aqueous solution having a non-ionic surfactant amount of 2 wt % are prepared.

Next, water is gently injected into the separation tank 11 from an injection/recovery port (not shown) provided at the lower end of the separation tank 11 as shown in FIG. 2 using a peristaltic pump or the like.

Next, similarly, the single-walled carbon nanotube dispersion liquid is injected into the separation tank 11.

Next, similarly, the aqueous solution having a non-ionic surfactant amount of 2 wt % is injected into the separation tank 11.

Figure 9:
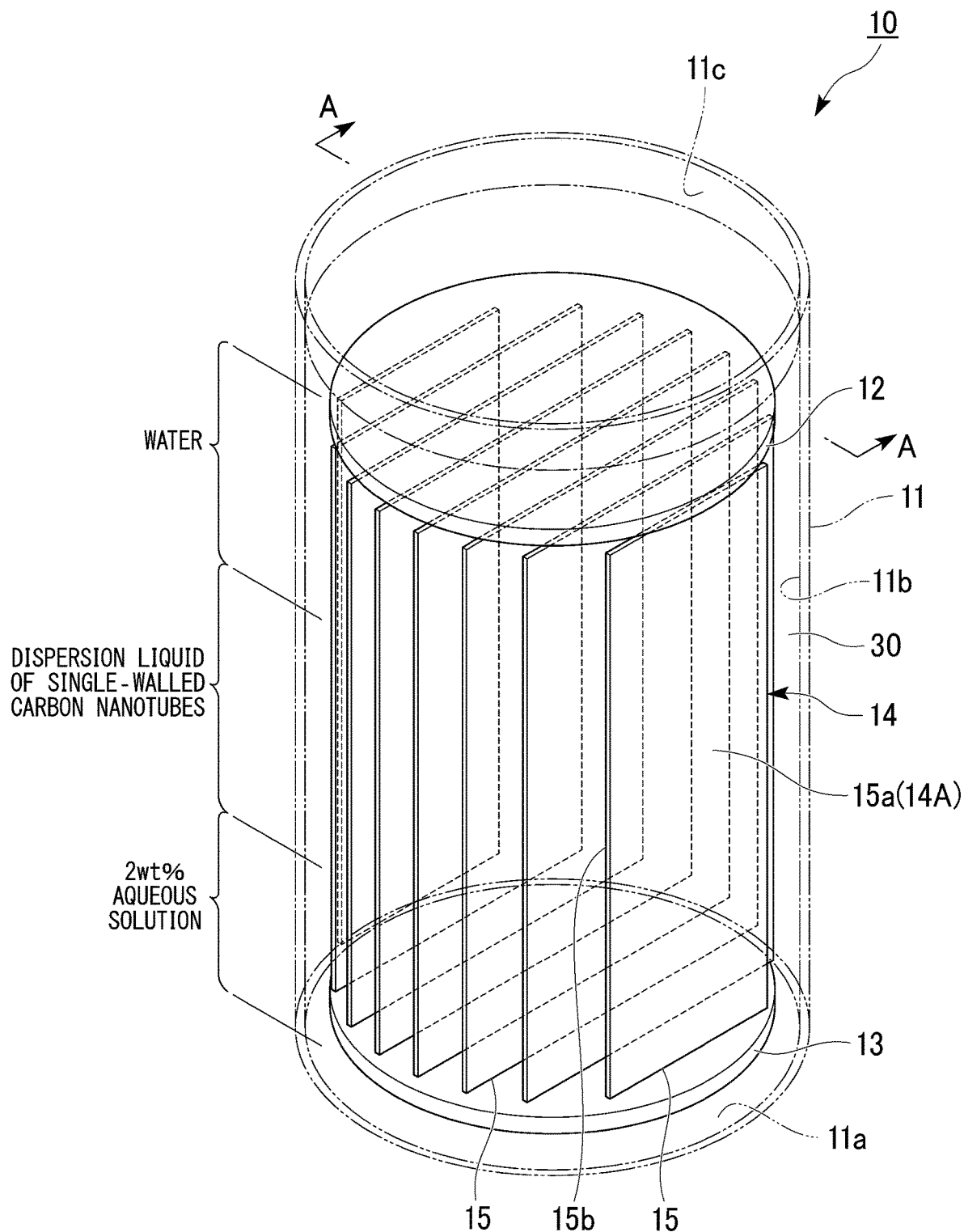
FIG. 9 is a perspective view showing a nanocarbon separation device of a sixth example embodiment.

Thereby, as shown in FIG. 9, a three-layer solution lamination structure in which a region in contact with the first electrode 12 is water, a region in contact with the second electrode 13 is a 2 wt % aqueous solution, and an intermediate region is the single-walled carbon nanotube dispersion liquid is formed.

In this case, the first electrode 12 is in contact with only water, and the second electrode 13 is in contact with only the 2 wt % aqueous solution. In addition, the first electrode 12 and the second electrode 13 are not in contact with the single-walled carbon nanotube dispersion liquid.

Hereinafter, as in the first example embodiment, the mixture of single-walled carbon nanotubes contained in the single-walled carbon nanotube dispersion liquid will be separated into metallic single-walled carbon nanotubes and semiconducting single-walled carbon nanotubes.

According to the nanocarbon separation method of the present example embodiment, the movement of the surfactant in the separation tank 11 can be reduced, which is effective in improving the separation efficiency.

The nanocarbon separation method of the present example embodiment can also be applied to the above first to fifth example embodiments.

Here, in the nanocarbon separation device of the present invention, the structure of the partition member is not limited to the above first to sixth example embodiments. For example, a columnar member in which a plurality of through-holes are formed in the thickness direction, and a spiral (helical) member in which a sheet or plate member is spirally (helically) wound may be used.

In addition, while a case in which the partition members 14, 101, 201, 301, and 401 are provided in parallel to the vertical direction of the separation tank 11 has been provided as an exemplary example in the above first to sixth example embodiments, the nanocarbon separation device of the present invention is not limited thereto. In the nanocarbon separation device of the present invention, the partition member may be obliquely provided in the vertical direction of the separation tank.

While the example embodiment that can be applied when the mixture of single-walled carbon nanotubes is separated into metallic single-walled carbon nanotubes and semiconducting single-walled carbon nanotubes has been described above, the present invention can be applied also for separation of a mixture of multi-walled carbon nanotubes, a mixture of double-walled carbon nanotubes, a mixture of graphene, and the like.

INDUSTRIAL APPLICABILITY

According to the nanocarbon separation device of the present invention, in separation of nanocarbons having different properties, it is possible to improve the separation efficiency. In addition, according to the nanocarbon separation device of the present invention, in separation of carbon nanohorns having different properties, it is possible to shorten a time required for the separation.

REFERENCE SYMBOLS 10, 100, 200, 300, 400 Nanocarbon separation device
11 Separation tank
12 First electrode
13 Second electrode
14, 101, 201, 301, 401 Partition member
15, 102 Plate member
16 Injection/recovery port
17 Cock
20 Suction device
21 Suction tube
30 Nanocarbon dispersion liquid
103, 202 First plate member
104, 204 Second plate member
203 First plate member group
205 Second plate member group
302 Tubular member
402 Columnar member

The invention claimed is:

1. A nanocarbon separation device, comprising:
a separation tank which is configured to accommodate a dispersion liquid including a nanocarbon;
a first electrode that is provided at an upper part in the separation tank;
a second electrode that is provided at a lower part in the separation tank; and
a partition member that is provided between the first electrode and the second electrode in the separation tank,
wherein the partition member partitions the separation tank into a plurality of regions.

2. The nanocarbon separation device according to claim 1, wherein the partition member is a plurality of plate members that are arranged in a horizontal direction of the separation tank.

3. The nanocarbon separation device according to claim 1, wherein the partition member includes a first plate member group including a plurality of first plate members that are arranged in a horizontal direction of the separation tank and a second plate member group which intersects the first plate member group and includes a plurality of second plate members that are arranged in the horizontal direction of the separation tank.

4. The nanocarbon separation device according to claim 1, wherein the partition member is a plurality of tubular members that are arranged in a horizontal direction of the separation tank.

5. The nanocarbon separation device according to claim 1, wherein the partition member is a plurality of columnar members that are arranged in a horizontal direction in the separation tank.

6. The nanocarbon separation device according to claim 1, wherein the partition member is vertically divided in a height direction of the separation tank.

7. The nanocarbon separation device according to claim 1, comprising
a recovery port that communicates with a bottom surface of the separation tank and is configured to recover the dispersion liquid from the lower part in the separation tank at a lower end of the separation tank,
wherein the recovery port comprises a rotary cock comprising a ground glass joint.

8. The nanocarbon separation device according to claim 1, comprising
a suction device that is configured to suck the dispersion liquid from the upper part in the separation tank.

9. A nanocarbon separation method using the nanocarbon separation device according to claim 1, the method comprising:
injecting a dispersion liquid including a nanocarbon into the separation tank; and
separating metallic nanocarbons and semiconducting nanocarbons included in the dispersion liquid by applying a direct current voltage to the first electrode and the second electrode.

10. A nanocarbon recovery method using the nanocarbon separation device according to claim 1, the method comprising
recovering metallic single-walled carbon nanotubes and semiconducting nanocarbons included in the dispersion liquid from the separation tank after a separation operation by the nanocarbon separation device is completed.

* * * * *